US010783057B2

(12) United States Patent
Beltran et al.

(10) Patent No.: US 10,783,057 B2
(45) Date of Patent: Sep. 22, 2020

(54) TESTING AS A SERVICE FOR CLOUD GAMING

(71) Applicant: Sony Interactive Entertainment LLC, San Mateo, CA (US)

(72) Inventors: Justin Beltran, San Mateo, CA (US); Kyle Cannon, San Mateo, CA (US); Nathan Gross, San Mateo, CA (US); Dylan Butler, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 34 days.

(21) Appl. No.: 16/198,682

(22) Filed: Nov. 21, 2018

(65) Prior Publication Data

US 2020/0159644 A1    May 21, 2020

(51) Int. Cl.
*G06F 11/36* (2006.01)
*A63F 13/23* (2014.01)
*A63F 13/77* (2014.01)
*G06N 20/00* (2019.01)
*A63F 13/60* (2014.01)
*A63F 13/63* (2014.01)

(52) U.S. Cl.
CPC .......... *G06F 11/3636* (2013.01); *A63F 13/23* (2014.09); *A63F 13/60* (2014.09); *A63F 13/63* (2014.09); *A63F 13/77* (2014.09); *G06F 11/3664* (2013.01); *G06N 20/00* (2019.01)

(58) Field of Classification Search
None
See application file for complete search history.

(56) References Cited

U.S. PATENT DOCUMENTS

| 8,560,991 B1* | 10/2013 | Fuss | G06F 30/33 716/112 |
|---|---|---|---|
| 2002/0049962 A1* | 4/2002 | Kelbaugh | G06F 11/3664 717/128 |
| 2011/0154109 A1 | 6/2011 | Levine et al. | 714/26 |
| 2011/0173239 A1* | 7/2011 | Sayed | G06F 11/3414 707/821 |
| 2015/0217198 A1 | 8/2015 | Curtis et al. | A63F 13/67 |

(Continued)

OTHER PUBLICATIONS

PCT/US2019/062301, Invitation to Pay Additional Fees and, Where Applicable, Protest Fee, Int'l Searching Authority, Annex to Form PCT/ISA/206, Apr. 20, 2020.

(Continued)

*Primary Examiner* — Jason T Yen
(74) *Attorney, Agent, or Firm* — Penilla IP, APC

(57) ABSTRACT

Technology is described for Testing as a Service (TaaS) for a video game. In one embodiment, a method includes an operation for receiving a game application for testing for one or more bugs. The method further provides for executing, by an automated game testing module, a plurality of automated sessions of the game session while implementing testing inputs for the plurality of automated sessions, the testing inputs include control inputs, game states, system parameters and network parameters. The method further includes operations for detecting an occurrence of a bug during the said executing the plurality of sessions for generating a snapshot file including a portion of the control inputs, the game state data, and a video component associated with the occurrence of the bug.

15 Claims, 14 Drawing Sheets

(56) References Cited

U.S. PATENT DOCUMENTS

| | | | |
|---|---|---|---|
| 2016/0196203 A1 | 7/2016 | Krishna et al. | G06F 11/3688 |
| 2016/0283363 A1 | 9/2016 | Krishna et al. | G06F 11/3688 |
| 2016/0354695 A1 | 12/2016 | Curtis et al. | A63F 13/67 |
| 2017/0132113 A1 | 5/2017 | Krishna et al. | G06F 11/3664 |
| 2017/0132114 A1 | 5/2017 | Krishna et al. | G06F 11/3664 |
| 2017/0266568 A1* | 9/2017 | Lucas | A63F 13/77 |
| 2017/0337116 A1* | 11/2017 | Negara | G06F 11/3664 |
| 2019/0108486 A1* | 4/2019 | Jain | G06F 11/3668 |
| 2019/0114672 A1* | 4/2019 | Jacobs | G06N 3/084 |
| 2019/0171549 A1 | 6/2019 | Krishna et al. | G06F 11/3664 |
| 2019/0347188 A1* | 11/2019 | Sobran | G06F 11/3476 |

OTHER PUBLICATIONS

Dhillon et al., "Reinforcement Learning for Fuzzing Testing Techniques", an IP.com Prior Art Database Technical Disclosure, IPCOM000252021D, Pub. Dec. 13, 2017.

* cited by examiner

TESTING AS A SERVICE FOR CLOUD GAMING

FIELD OF THE DISCLOSURE

The present disclosure relates generally to video game development, and more particularly, to methods and systems for providing cloud testing of video games as a service.

BACKGROUND

Video game testing is a part of the game development process that maintains quality control of the video game. One of the functions of game testing is the discovery and documentation of software defects, e.g., bugs, that impair the use of the video game. In the past, game testing required relatively little manpower because of the small scale and lower complexity of the video games. Today, video game testing is a large scale and expensive effort employed by developers and game publishers to ensure their game applications run smoothly. This is due to the large scope and complexity of today's video games and the demand from consumers for near flawless game action. As a result, game testing plays a large role in ensuring that released games function smoothly and without bugs, glitches, or other defects. Some publishers may have dozens of quality assurance testers working on a particular game title at a given time, which can be expensive. Moreover, when game testers do identify a bug, the identified bugs are not always reproducible by the developer because of variances associated with the game tester's game session and other factors.

It is in this context that embodiments arise.

SUMMARY

Embodiments of the present disclosure relate to methods and systems for game testing replay, automated game testing, and testing as a service (TaaS).

In one embodiment, a method is provided. The method includes an operation for executing, on a server of a cloud testing system, a video game for play by a player, said executing the video game producing a video output. The method also includes an operation for receiving, from a client device of the player, a sequence of control inputs for interacting with the video game, a portion of the sequence of control inputs causes a bug to appear during said interacting with the video game. Further, the method includes an operation for recording the portion of sequence of control inputs that caused the bug along with the video output and game state data produced by the video game in a player-generated snapshot file. Moreover, the method includes an operation for processing the player-generated snapshot file using a machine learning module, the machine learning module extracts features from the sequence of control inputs, the video output, and the game state for classification into a bug detection model. Furthermore, the method includes an operation for identifying, using the bug detection model, a set of test control inputs that are likely to reproduce the bug by the video game.

In another embodiment, a method is provided. The method includes an operation for generating player-generated snapshot files from game play of one or more players of a video game, each of the player-generated snapshot files includes a sequence of control inputs, game state data, and a video component that are associated with a portion of the game play of the video game in which a bug occurred. The method also includes an operation for processing the player-generated snapshot files using a machine learning module to generate a plurality of machined-learned control inputs that are in addition to the sequence of control inputs from the player-generated snapshot files for reproducing the bug. Further, the method includes an operation for executing a plurality of automated video game sessions while inputting respective machine-learned control inputs, said executing the plurality of automated video game sessions each producing respective game state data, and respective video components, wherein the respective machine-learned control inputs, the respective game state data, and the respective video components are recorded in respective machine-generated snapshot files. Additionally, the method includes an operation for processing, using the machine learning module, the machine-generated snapshot files to identify bug-implementation conditions, the bug-implementation conditions are usable to identify categories of sequences of control inputs causative of the bug that are in addition to the sequence of control inputs of the player-generated snapshot files.

In another embodiment, a method is provided. The method includes an operation for receiving, at a server, a game application for testing for one or more bugs. The method further includes an operation for executing, by an automated game testing module, an automated session of the game application while implementing testing inputs for the automated session, the testing inputs include control inputs, game state data, system parameters, and network parameters. Additionally, the method provides for detecting, by a bug reporter, an occurrence of a bug during said executing the automated game session. Moreover, the method provides for generating a snapshot file including a portion of the control inputs, the game state data, and a video component associated with the occurrence of the bug.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Embodiments of the present disclosure relate to methods and systems for enabling game developers to reproduce bugs identified by game testers. Embodiments of the present disclosure also relate to methods using machine learning algorithms to provide additional machine-learned control inputs that are causative of a previously identified bug or an unidentified bug. Moreover, embodiments of the present disclosure relate to method and systems for automating portions of the testing process to test the game under varying system-related conditions. Further, embodiments of the present disclosure relate to allowing aspects of game testing to be performed as a service. It will be obvious, however, to one skilled in the art, that the present disclosure may be practiced without some or all of these specific details. In other instances, well known process operations have not been described in detail in order to not unnecessarily obscure the present disclosure.

Game testing is an expensive and time-consuming process. Virtually all game titles that make it to a commercial stage will have gone through many rounds of testing to ensure a level of functional and artistic quality. There are a variety of roles that testing plays in the development of a video game application for release. Some of these include functionality testing, compliance testing, compatibility testing, load testing, beta testing, multiplayer testing and the like. Overall, the goal of game testing is to ensure the video game runs smoothly, e.g., in an expected manner, across various hardware platforms. Thus, one of the goals of game testing is to identify bugs in the video game that prevent the game from running smoothly. Bugs can be manifested in a number of ways. Generally, a bug refers to a portion of the game and its associated code where an unanticipated result occurs, whether the unanticipated result is related to game logic, game mechanics, a glitch, artwork, a system malfunction, or other game or system response that is other than which is desired, anticipated, or expected.

Figure 1:
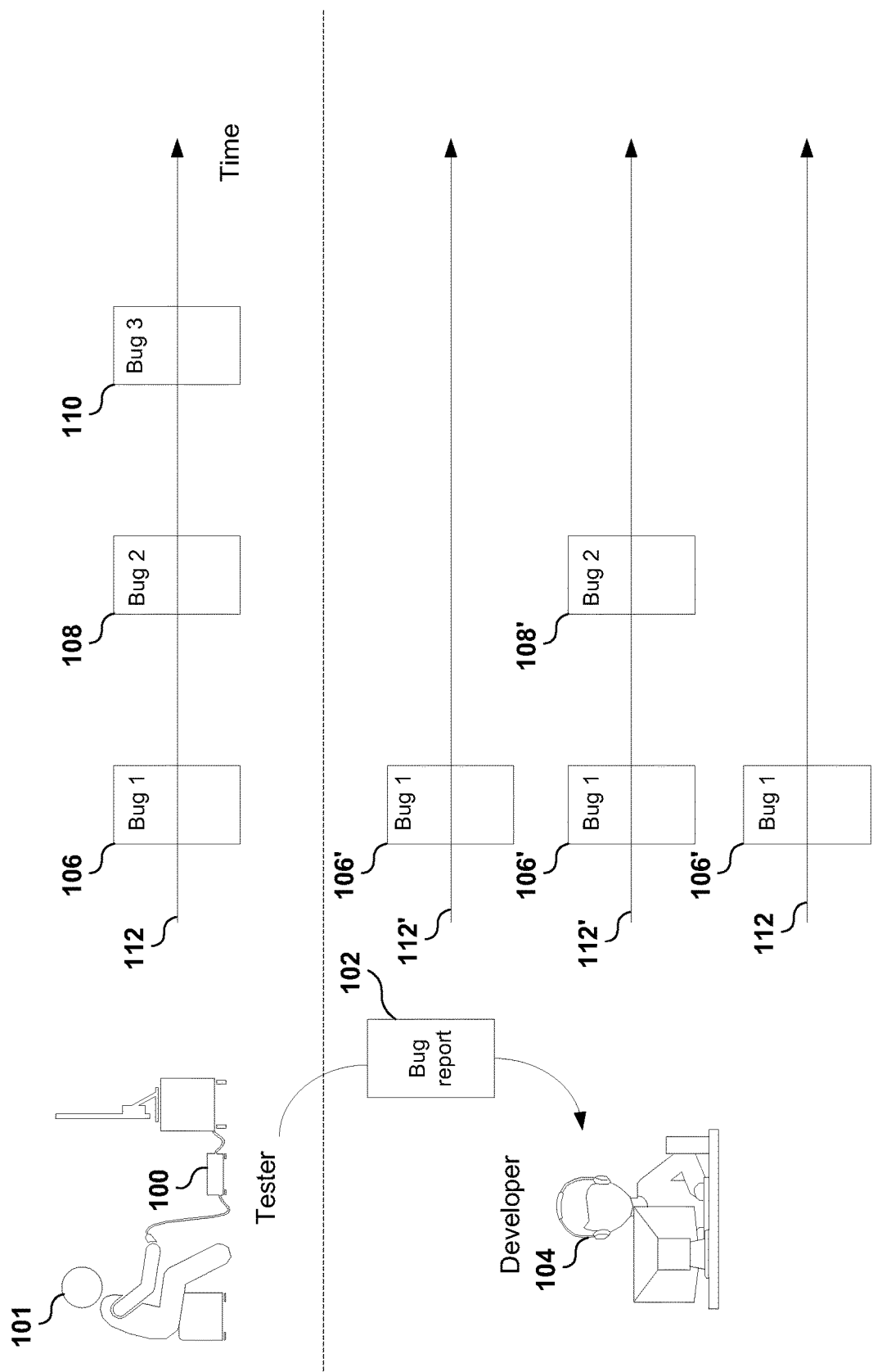
FIG. 1 shows a conceptual diagram of bug reporting and reproduction, according to one embodiment.

FIG. 1 shows a conceptual diagram of bug reporting and reproduction, according to one embodiment. A game tester 101 is shown to play through a segment 112 of a video game using a testing device 100 such as a development kit. The game tester 101 uncovers three bugs 106, 108, and 110 through playing the segment 112 of the video game. The game tester 101 is then shown to furnish a bug report 102 that is delivered to the developer 104. The bug report 102 may be provided through a defect tracking system and may specify the circumstances (e.g., a level or map coordinate) under which the bug was produced and certain steps for reproducing the bug (e.g., a set of control inputs). The developer 104 uses the bug report 102 to reproduce the bugs 106, 108, and 110 before attempting to fix them.

The developer 104, who may be an artist, a programmer, or a game designer, etc., successfully reproduces bug 106' on each of three attempts and bug 108' on the second of the three attempts. The developer 104 is unable to reproduce bug 110. The inability to reproduce certain bugs such as bug 110 and the ability to reproduce bugs intermittently such as bug 108 may result from a number of factors associated with the game play of the game tester 101. For example, the game tester 101 and the developer 104 may have differing seed data or other game state data or may have inputted the sequence of control inputs in a very temporally unidentical ways. Additionally, there may be system variances (e.g., latency, jitter, CPU clock, GPU clock, memory usage, etc.) associated with the testing device 100 of game tester 101 that factored into the production of bugs 108 and 110. These system variances would be difficult for the developer 104 to track and to mimic for the reproduction of bugs 108 and 110 using current methodology. Moreover, it may be the case that some game testers report bug 110 while others do not, resulting in an epistemological conflict of whether bug 110 exists and whether it should be dealt with. An improved methodology and system are contemplated for providing faithful reproduction of bugs.

Figure 2:
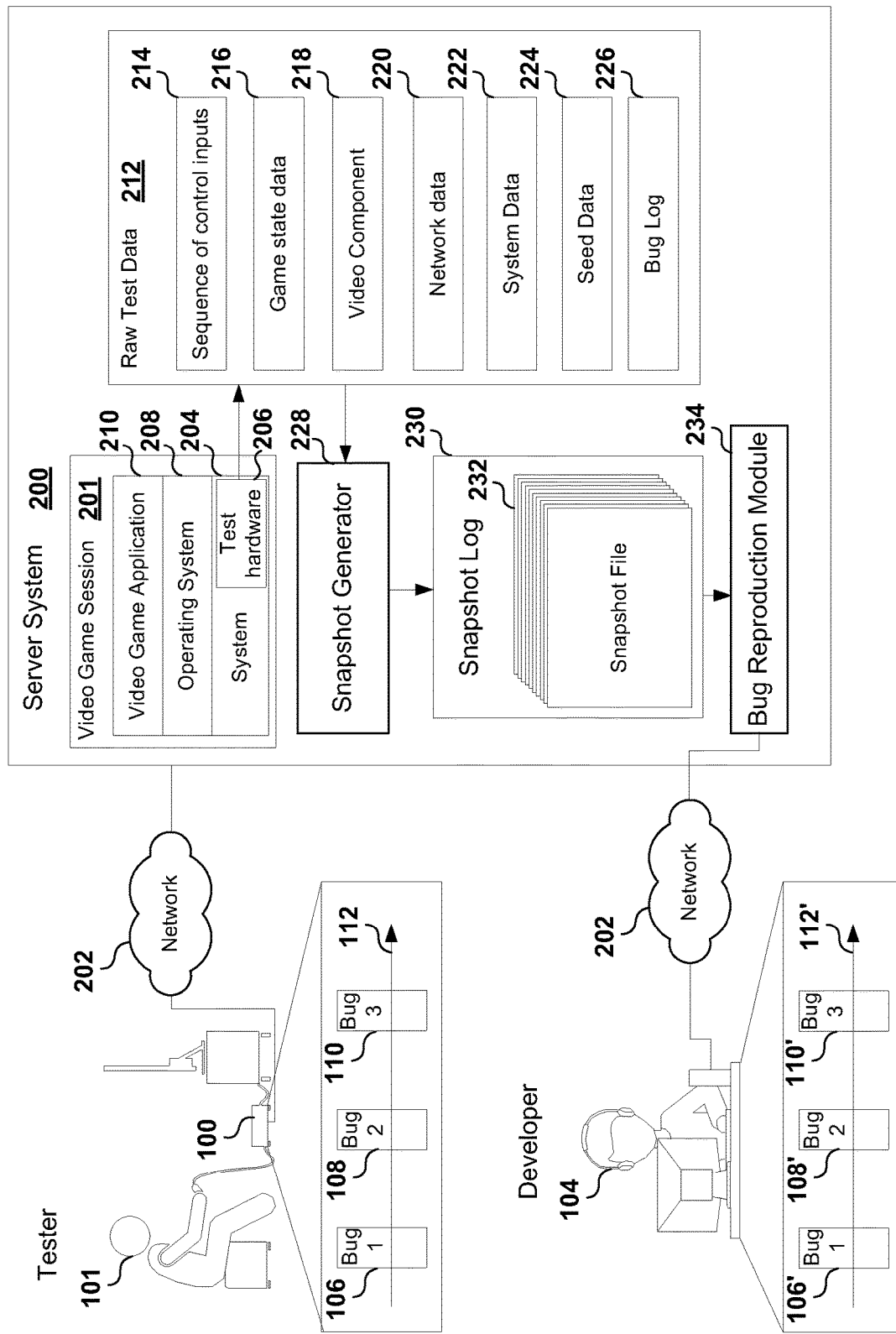
FIG. 2 shows a conceptual illustration of an improved method and system for faithfully reproducing bugs uncovered by a game tester, according to one embodiment.

FIG. 2 shows a conceptual illustration of an improved method and system for faithfully reproducing bugs uncovered by a game tester 101, according to one embodiment. Similar to FIG. 1, game tester 101 of FIG. 2 is shown to have produced bugs 106, 108, 110 during interaction with segment 112 of a video game. The segment 112 may be a part of a video game session 201 that is executed on a server system 200. That is, for example, the video game session 201 may be hosted by a system 204 having test hardware 206 of the server system 200. The test hardware 206 may be proprietary in some embodiments.

The system 204 is shown to run an operating system 208 on which the video game application 210 for testing is being executed. The game tester 101 interacts with the video game session 201 via network 202. For example, video game application 210 is contemplated to generate audio and video components at the server system 200 for delivery and presentation to the game tester 101. The server system 200 then receives control inputs from the game tester 101 via network 202 for the game tester 101 to interact with the video game session 201. In other embodiments, the video game session 201 may be executed on the testing device 100 that is local to the game tester 101. In any case, however, a set of raw test data 212 is produced as a result of the game tester 101 interacting with the video game application 210 during the video game session 201.

The raw test data 212 is shown to include the sequence of control inputs 214, which may be any suitable data structure that has control inputs as data elements as a function of time. For example, the sequence of control inputs 214 is contemplated to record each of the various control inputs as inputted on some input device of the game tester 101, including button pushes, keystrokes, mouse clicks, cursor movements, controller movements, joystick movements, voice commands, movement of the body and other inputs made by the game tester 101. Each of the data elements of the sequence of control inputs 214 may be timestamped according to the moment the control input is registered by video game application 201 as well as the moment in which they are inputted at the controller in the real world. The raw test data 212 is also shown to include game state data 216, which may be of any suitable data structure for capturing the game environment, including saved data, game values, map data, asset data, and others. The game state data 216 is also contemplated to be timestamped so that bugs may be time-referenced to game state data 216.

As the game tester 101 interacts with the video game application 201 for uncovering bugs 106, 108, and 110, a video component 218 is generated by the system 204 as instructed by the video game application 210. The video component 218 may include both an audio component and a video component in the form of a sequence of video frames. Additionally, as the game tester 101 interacts with the video game application 210 various network and system properties associated with the video game session 201 are captured in real time or near real time in network data 220 and system data 222, respectively, as a part of the raw test data 212. It is contemplated that network data 220 may include various parameters associated with the communications link between the server system 200 and the game tester 101, including, for example, latency, jitter, data rate capacity, packet loss, quality of service (QoS), throughput, and other network properties. It is completed that system data 222 may include various parameters associated with the system 204 or testing device 100 that executes the video game application 210, including a CPU clock, GPU clock, memory usage, frame rate, resolution, and other system properties. Both of the network data 220 and system data 222 are contemplated to be time-stamped so that bugs may be time-referenced to a particular time within network data 220 and/or system data 222.

Also shown to be included in raw test data 212 are seed data 224 and a bug log 226. Seed data 224 refers to an initial set of data that the video game application 210 uses to introduce some variation or randomness into the video game. Seed data 224 may make use of random number generators in some embodiments. Additionally, the bug log 226 records markers or flags the game tester 101 inputs for indicating the existence of a bug. For example, when the game tester 101 encounters each of bugs 106, 108, and 110, they may indicate so much in the bug log 226. The bug log 226 is also contemplated to be timestamped such that the time in which each of bugs 106, 108, and 110 occur may be referenced to a particular window in each of the sequence of control inputs 214, the game state data 216, the video component 218, network data 220, and system data 222.

The snapshot generator 228 is configured to generate snapshot files 232 that are stored in a snapshot log 230. Each snapshot file 232 is contemplated to be associated with a particular bug and include a portion of the sequence of control inputs 214, the game state data 216, the video component 218, the network data 220, the system data 222, the seed data 224 and the portion of the bug log 226 associated with the bug. For example, each of bugs 106, 108, and 110 is contemplated to be included within a snapshot file 232 that the snapshot generator 228 generates. For example, when the game tester 101 indicates the existence of bug 106, the snapshot generator 228 is contemplated to access a window corresponding to the timestamp of the bug 106 in the bug log 226 for each of the sequence of control inputs 214, the game state data 216, the video component 218, the network data 220, the system data 222 and the seed data 224 to generate a snapshot file 232 for bug 106. The window may be between about 1 minute to 10 minutes prior to and subsequent to the occurrence of bug 106. The snapshot generator 228 is contemplated to also generated snapshot files 232 for bugs 108 and 110 to be stored in the snapshot log 230. In addition to snapshot files 232 for bugs 106, 108, and 110 as uncovered or produced by game tester 101, the snapshot log 230 may be a database for snapshot files 232 associated with various additional bugs as uncovered or produced by other game testers or by automated game testing agents.

The server system 200 is also contemplated to host a bug reproduction module 234 that interfaces with a device of a developer 104 over network 202 to reproduce the bugs 106', 108', and 110'. There a number of ways in which the bug reproduction module 234 is contemplated to allow the developer 104 to reproduce the bug. Three non-limiting embodiments include a replay mode, an automated reproduction mode, and a manual reproduction mode. In the replay mode, the snapshot file 232 is replayed to the developer 104 such that the bugs 106', 108', and 110' are played back to the developer 104 as they appeared to the game tester 101. As a result, bugs 106, 108, and 110 are represented identically to the way in which they were manifest to the game tester 101.

In the automated reproduction mode, the bug reproduction module 234 is contemplated to load the game state data 216 associated with a snapshot file 232 for execution of the video game application 210. The bug reproduction module 234 may access system 204, test hardware 206, operating system 208, and the video game application 210 for execution of the snapshot file 232 in the automated reproduction mode. For example, the system 204 may load the game state data 216 to spin-up the video game session 201 between about 5 seconds to about 10 minutes, or between about 10 seconds and 5 minutes, or between about 15 seconds and about 60 seconds prior to the occurrence of each of bugs 106, 108, 110. Once the video game session 201 is spun-up, the sequence of control inputs 214 is automatically inputted to the video game application 210 based on the timestamp of each of the control inputs of the sequence of control inputs 214. As a result, the sequence of control inputs 214 is synchronized with the game state data 216 such that the video game session 201 is recreated for the developer 104 in real time. In other embodiments, the bug reproduction module 234 may be provisioned with dedicated replay system hardware, operating systems, and a development version of the video game application. In addition to replicating the sequence of control inputs 214 during execution of the video game application 210, the network data 220, system data 222, and the seed data 224 may also be replicated, mirrored, or simulated to recreate the operating conditions during the windows in which bugs 106, 108, and 110 occurred. In this manner, the bugs 106', 108', and 110' are generated anew for the developer but can be theoretically identical to bugs 106, 108, and 110 as observed by the game tester 101.

In the manual reproduction mode, the game state data 216 of a snapshot file 232 is loaded by the bug reproduction module 234 for execution of the video game application 210 at a state within the video game session 201 that is between about 5 seconds to about 10 minutes, or between about 10 seconds and 5 minutes, or between about 15 seconds and about 60 seconds prior to the occurrence of each of bugs 106, 108, 110. However, instead of automatically inputting the sequence of control inputs 214, the developer 104 is provided with a textual or visual representation of the sequence of control inputs 214 so that they can manually recreate bugs 106', 108', and 110'. In this manner, the developer 104 causes or triggers the manifestation of the bugs 106', 108', 110' and can experiment with other configurations of control inputs that may or may not trigger the same bug. As a result, the developer 104 may better understand the parameters causing the bug. In any case, the bug reproduction module enables the developer 104 to reproduce bugs 106', 108', and 110' as identified by the game tester 101 so that the developer 104 may fix them.

Figure 3:
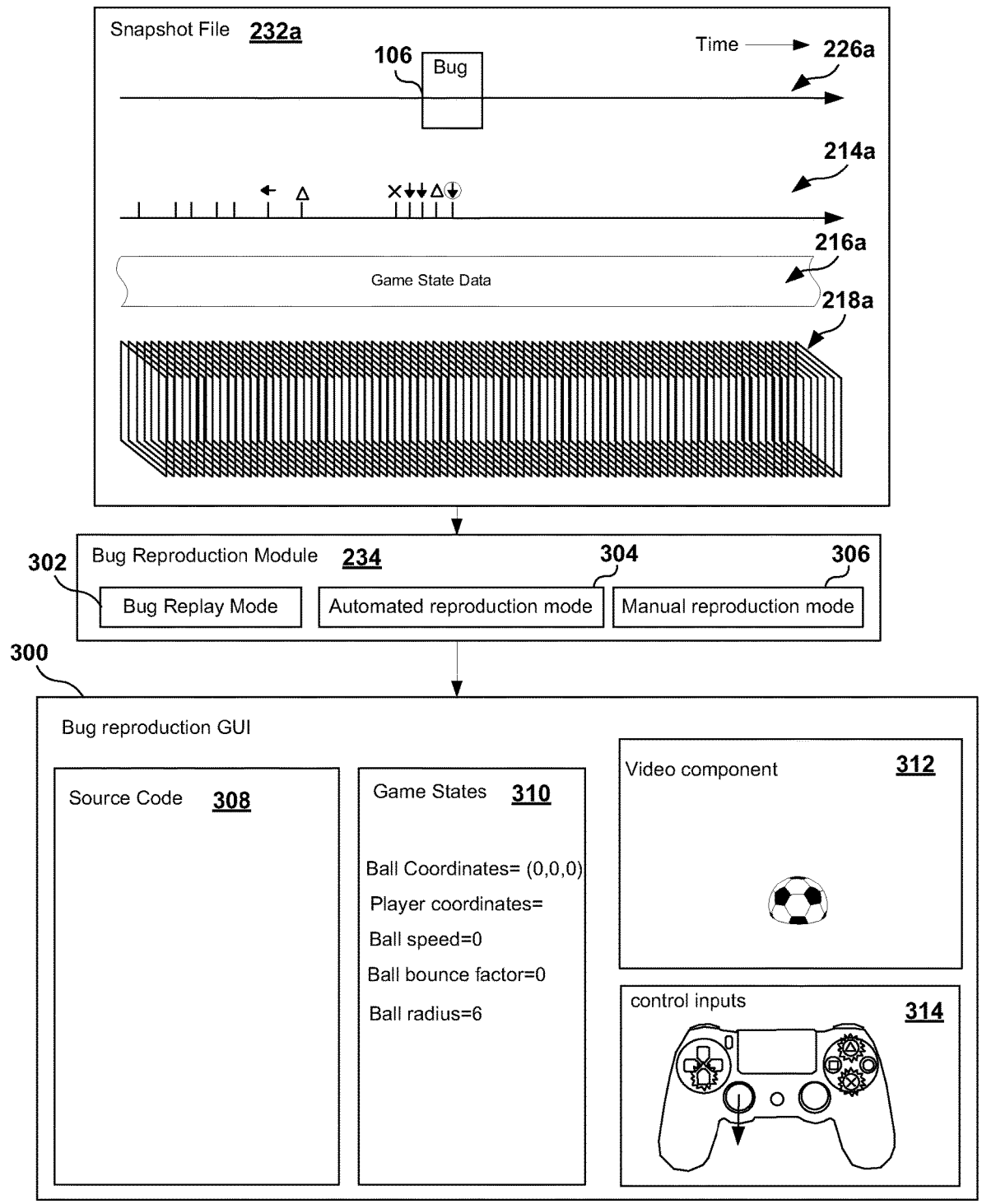
FIG. 3 shows a conceptual illustration of a bug reproduction module that is used to reproduce a bug identified by a game tester by processing a snapshot file that captures the bug, according to one embodiment.

FIG. 3 shows a conceptual illustration of a bug reproduction module 234 that is used to reproduce a bug 106 identified by a game tester by processing a snapshot file 232 that captures the bug 106, according to one embodiment. The snapshot file 232a "captures" bug 106 by containing a portion of the bug log 226a, a portion of the sequence of control inputs 214a, a portion of game state data 216a, and a portion of the video component 218a that is time-associated with the occurrence of the bug 106'. Although not shown, system data, network data, and seed data are also contemplated to be included within a snapshot file 232a associated with bug 106'. In certain embodiments, each snapshot file 232a associated with one instance of a bug. For example, if bug 106 is captured by snapshot file 232a, bugs 108 and 110 may be captured by respective snapshot files. However, when bugs are closely associated to one another such as when a first bug causes a second bug or when the first and second bugs occur very close in time to one another, both the first and second bugs may be captured by one snapshot file.

In the embodiment shown, the bug reproduction module 234 is contemplated to execute a bug replay mode 302 to simply replay the bug, an automated reproduction mode 304 for automatically reproducing an identical instance of the bug, or a manual reproduction mode 306 for instructing the developer to manually reproduce the bug. In any of the aforementioned modes, the bug reproduction module 234 generates a bug reproduction GUI 300 for the developer to interact with. The bug reproduction GUI 300 is shown to include multiple panels for display, including a source code 308 panel, a game states 310 panel, a video component 312 panel, and a control inputs 314 panel. The video component 312 shows that bug 108 involves a soccer ball that falls through the field. If the bug reproduction module 234 is in bug replay mode 302, the video frames shown in video component 312 are taken directly from video component 218a as was displayed for the game tester. If instead the automated reproduction mode 304 or the manual reproduction mode 306 are employed, the video component 312 may include newly generated video frames as a result of executing the game application while inputting the sequence of control inputs 214a. However, even in automated reproduction mode 304 or in manual reproduction mode 306, the bug reproduction GUI 300 may also display video frames generated for display to the game tester (e.g., original frames) such that developer can view the original frames and the newly-generated frames side-by-side.

The source code 308 may include the video game programming code containing instructions for operation of the video game, including code for game mechanics, game logic, asset management, game physics, multiplayer mechanics, and metadata management. The source code 308 panel is envisioned to display the code being executed during the occurrence of bug 108. For example, the source code 308 may include instructions to the game engine to drop the soccer ball from a height of 5 units. The source code 308 panel is contemplated to scroll to the relevant portions of the game code as the bug is being reproduced.

The game states 310 is shown to include various game state values associated with the soccer ball. Here, the game state 310 shows that the "ball bounce factor" is set to "0," while the "ball radius" is set to "6." The game states 310 panel enables the developer to view various game state values and game engine parameters as they change during reproduction of the bug.

Additionally, the control inputs 314 panel enables the developer to view the sequence of control inputs 214a that may have caused the bug. Here, a virtual representation of the controller the game tester used is provided to present the sequence of control inputs 214a as they were inputted by the game tester. For example, the sequence of control inputs 214a show that the game tester inputted the following sequence: "X-down-down-triangle-left_joystick_down." The same sequence may be represented virtually on the virtual controller with the same sequence and timing as that of the sequence of control inputs 214a. For example, the virtual controller may have "X" button depressed, the down button depressed twice, the triangle button depressed, and the left joystick angled down in sequence.

Figure 4:
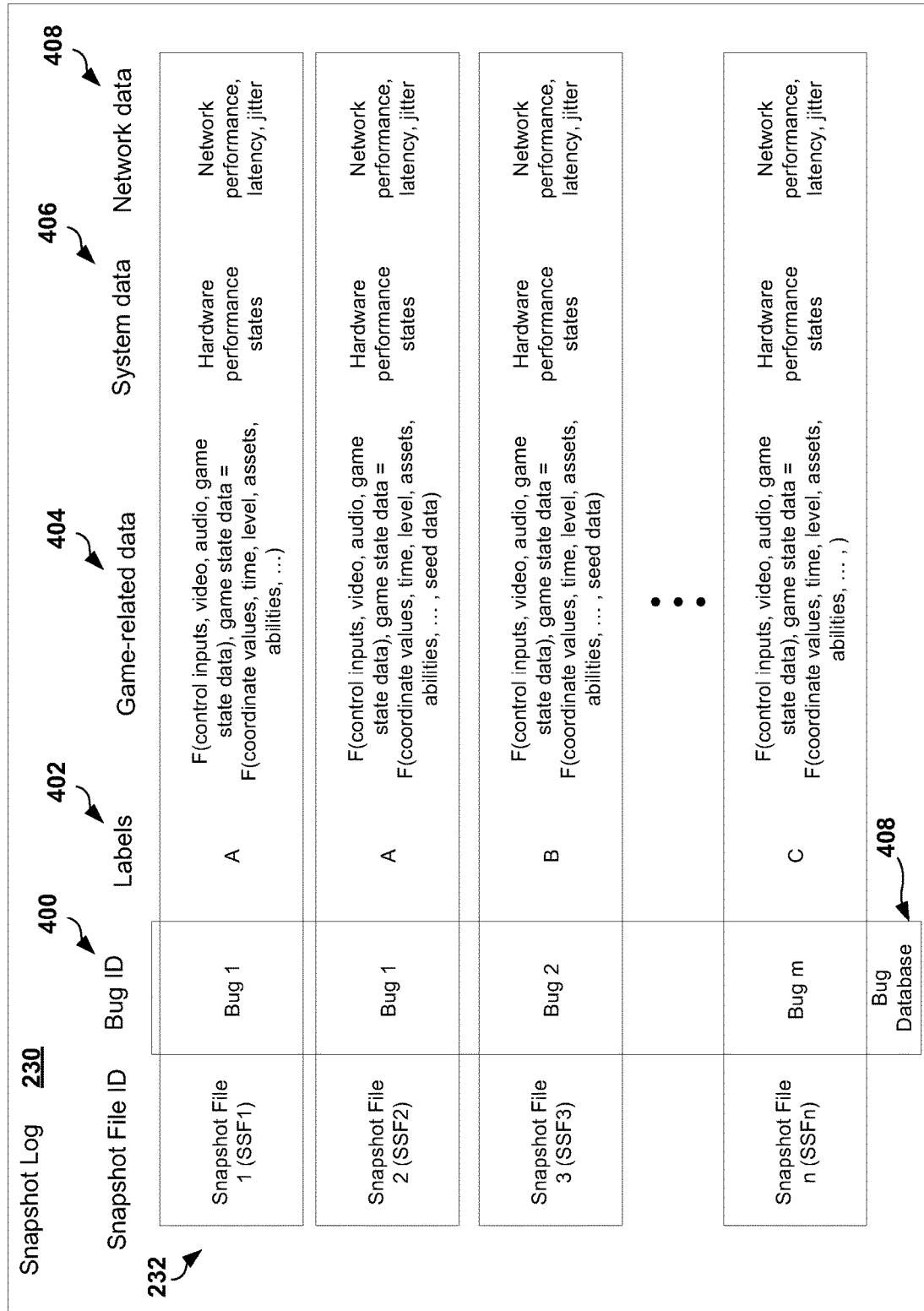
FIG. 4 shows a conceptual diagram of a snapshot log including a plurality of snapshot files, according to one embodiment.

FIG. 4 shows a conceptual diagram of a snapshot log 230 including a plurality of snapshot files 232, according to one embodiment. The snapshot log 230 may include snapshot files 232 generated by one game tester or a number of game testers. Each snapshot file 232 in the snapshot log 230 includes a snapshot file identifier 401, a bug identifier 400, a label 402, game-related data 404, system data 406, and network data 408. The bug identifier 400 may be synchronized with a defect tracking system such that bugs of the same token are provided with the same bug identifier 400. The labels 402 may be annotated by the game tester or the developer and may include a description of the type of bug, the severity of the bug, and descriptors useful for classifying bugs across the snapshot log 230. Game-related data 404 may be represented in multi-dimensional space as a function of control inputs, video output, audio output, and game state data. The game state data itself may be represented in multi-dimensional space as a function of various game state values, coordinate values of objects, time coordinates, level, assets, abilities, seed data, and so on.

Further, system data 406 includes time-dependent state data of the system executing the game application in which the associated bug was identified. System data may include system performance data such as CPU clock and usage, GPU clock and usage, memory speed and usage, frame rate, resolution, video compression codec and ratio, temperature indicators, and other indicators of system performance. Network data 408 is contemplated to include time-dependent indicators of communication channel between a game tester and a server system hosting the video game application. These indicators may specify latency, data rate capacity, jitter, and other communications properties.

Figure 5:
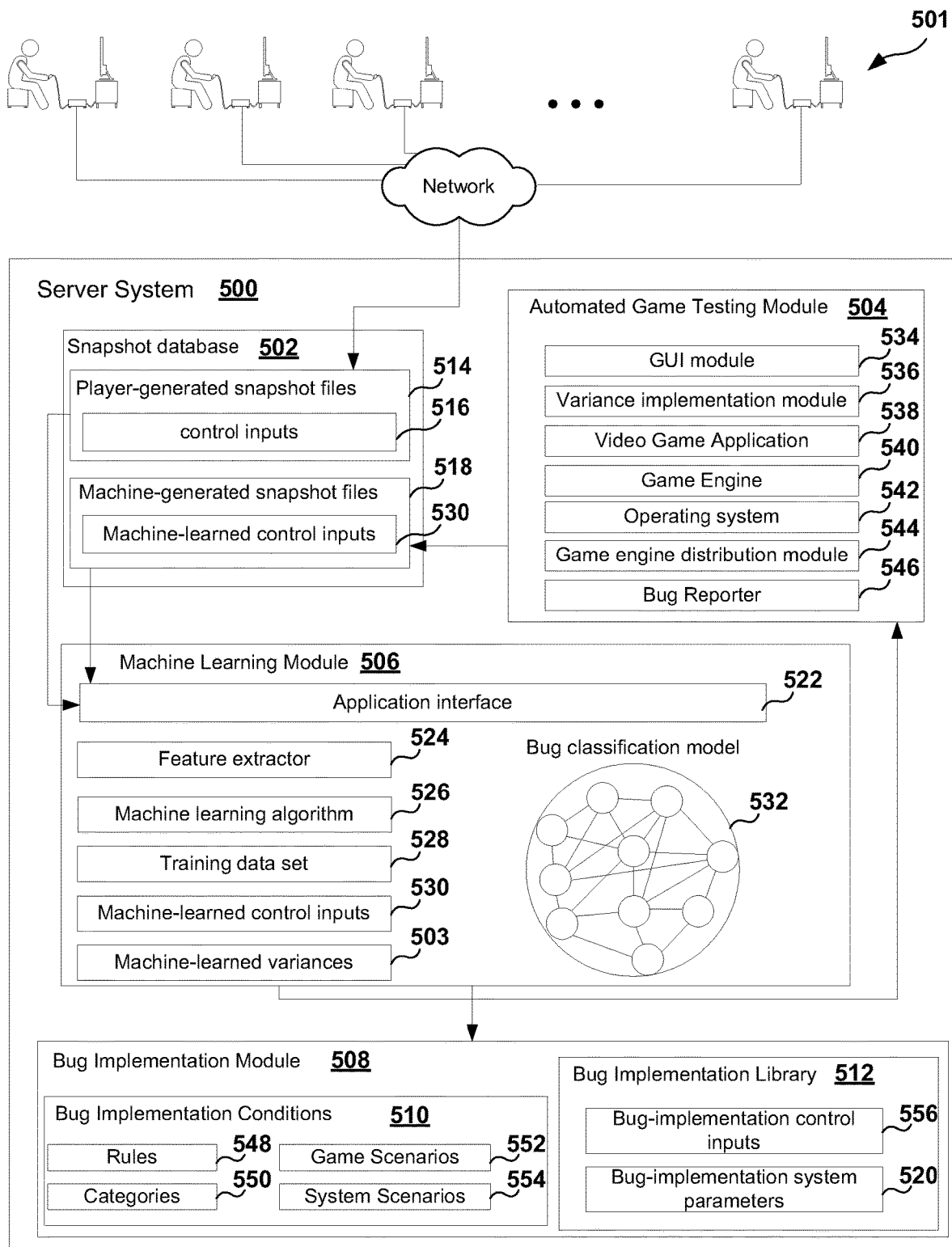
FIG. 5 illustrates how a cloud-based testing server system implements machine learning to generate new control inputs that are statistically relevant to causing a previously identified bug or a newly identified bug, according to one embodiment.

FIG. 5 illustrates how a cloud-based testing server system 500 implements machine learning to generate new control inputs that are statistically relevant to causing a previously identified bug or a newly identified bug, according to one embodiment. The server system 500 includes a snapshot database 502, an automated game testing module 504, a machine learning module 506, and a bug implementation module 508. A plurality of game testers 501 are shown to interact with a video game for identifying bugs. When bugs are identified, player-generated snapshot files 514 pertaining to those player-generated bugs are recorded in the snapshot database 502. The player-generated snapshot files 514, including the control inputs 516 are inputted into the machine learning module 506 via an application interface 522. In some embodiments, the player-generated snapshot files 514 may be used as a training data set 528 or ground truth. The feature extractor 524 analyzes the player-generated snapshot files 514 determines values in feature space related to the generation of the particular bug. The feature extractor 524 may be defined to analyze features associated with the sequence of control inputs, timing of control inputs, prior history of control inputs, etc. Additionally, the feature extractor 524 may analyze features associated with game state values, seed values, system parameters and network parameters.

The machine learning module 506 uses the machine learning algorithm 526, the training data set 528, the player-generated snapshot files 514 to generate a bug classification model 532. The bug classification model 532 is usable to identify machine-learned control inputs 530 that are in addition to the player-generated control inputs 516. The machine-learned control inputs 530 are statistically predictive of causing the bug. Any suitable machine learning algorithm 526 may be implemented for generating the bug classification model 532, including, but not limited to a Bayesian network, linear regression, decision trees, neural networks, k-means clustering, and the like. The bug classification model 532 provides statistically relevant combinations, permutations, and time-dependent sequences of control inputs that are predictive of causing the player-generated bug or a newly identified bug. The training data set 528 and the player-generate snapshot files 514 are usable to assign labels to each set of incoming control inputs 516. The labels may include "bug," or "not a bug."

In various embodiments, each set of the machine-learned control inputs 530 are implemented by the automated game testing module 504. The automated game testing module 504 is configured to spin up a plurality of game sessions to test the sets of machine-learned control inputs 514 for the occurrence of a bug or not. The automated game testing module 504 includes a GUI module 534, a variance implementation module 536, the video game application 538, the game engine 540, the operating system 542, a game engine distribution module 544, and a bug reporter 546. The GUI module 534 enables a developer to interface with the automated game testing module 504 and to specify conditions under which the automated game session is to be run. For example, the developer may decide to introduce variances in system or network parameters (hereafter, "variances") via the variance implementation module 536 while running the automated game sessions. In some embodiments, the machine learning module 506 may also provide a set of machine-learned variances that instruct the variance implementation module 536 on how to introduce variance during the automated gaming sessions. In other embodiments, the developer may choose to load-test the video game application by introducing variances via the variance implementation module. For example, the developer is envisioned to be enabled to specify a frame rate, resolution, CPU clock and usage, GPU clock and usage, and memory usage parameters to be simulated during execution of the automated video game sessions. Additionally, the developer may specify network variances such as latency, jitter, data rate capacity, and other network properties to be simulated during the automated video game sessions.

Any suitable number of video game sessions may be spun up in parallel depending upon the number of machine-learned control inputs 530 to be implemented, the variances sought to be introduced, and the granularity of the changes or differences in parameters between runs. In any case, when an automated game session is run by the automated game testing module 504, video game application 538 may be loaded with a particular game state that is immediately prior to the expected occurrence of the bug, for example, by about 5 seconds to about 10 minutes, or about 10 seconds to about 5 minutes, or about 30 seconds to about 1 minute prior. As the video game application 538 is executed, the machine-learned control inputs 530 are inputted in a time-dependent manner. Additionally, the automated game session may be executed while simultaneously implementing variances via the variance implementation module 536. In this manner, a plurality of automated game sessions may be implemented using one set of machine-learned control inputs 514 where each session tests for different variances. For example, a first automated game session may implement a low level of jitter while a second automated game session may implement a higher level of jitter. A third automated game session may overclock a GPU while a fourth automated game session may underclock a similar GPU, and so on.

Further, as the automated game session are executed, a bug reporter 546 may be layered on top of each game session for detecting the occurrence of the bug. The bug reporter 546 may be pre-defined to automatically detect the bug by game states produced by the automated game session that are indicative of the bug. Additionally, the bug reporter 546 detect bugs associated with game mechanisms or rendering by using image analysis to identify images or portions of images indicative of the bug.

The results of the automated sessions, whether reproducing the bug or not, are recorded as machine-generated snapshot files 530. The machine-generated snapshot files 518 are labeled as "bug" or "not a bug" based on the results of the bug reporter 546. However, a developer may also annotate or change the label if the bug reporter 546 results are inconclusive or incomplete, or if the developer disagrees with the label. The machine-generated snapshot files 518 having been labeled are then feed into the machine-learning module 506 for training or updating the bug classification model 532.

When the bug classification model 532 is updated, a new set of machine-learned control inputs 530 may be generated and tested using the automated game testing module 504. The process of learning via the machine learning module 504, validation via the automated game testing module 504 (e.g., supervision), and refining the bug classification model 532 may be repeated until there is some acceptable level of confidence that the bug classification model 532 classifies control inputs are predictively causative of a bug or not. That is, for example, the process of learning, validation, and model refinement may be repeated until the bug classification model 532 is able to classify new control inputs to be either causative of a bug or not causative of a bug with, say, a 99% confidence interval. Additionally, with each iteration of learning, validation, and refinement, it is envisioned that the machine learning module 506 may generate sets of machine-learned control inputs 530 that more statistically predictive of causing the bug. Conversely, the machine learning module 506 also improves at identify those sets of control inputs that are not predictively causative of the bug.

While the machine learning module 506 has been described thus far as learning in terms of control inputs, such as those from the player-generated snapshot files 514, the machine learning module 506 is also envisioned to learn based upon system and network variances. For example, similar to generating machine-learned control inputs 530 based upon the bug classification model 532, the machine learning module 506 may also generate machine-learned variances 503 that are predictively causative of the bug. Thus, the machine learning module 506 may detect patterns of system and network parameters that are attendant to the occurrence of the bug and may generated machine-learned variances 503 to system and network parameters for testing via the automated game testing module 504. The automated game testing module 504 may be implemented via the variance implementation module 536 such that system and network conditions specified by the machine-learned variances 503 are simulated, mimicked, or reproduced during execution of the automated game sessions. The results of the bug reporter of the occurrence of a bug or not may be recorded in the machine-generated snapshot files 518 along with the machine-learned control inputs 530. For example, the bug reporter 546 may serve to label each run with a label of "bug," or "not a bug," or "inconclusive." A human labeler may later resolve the automated game sessions labeled "inconclusive" as "bug" or "not a bug."

As with the machine-learned control inputs 530, the results from the machine-learned variances 503 may then be fed back into the machine-learning module 506, which functions to update the bug classification model 532. The cycle of learning, testing, and updating the bug classification model 532 serves, in one capacity, to determine the set of system and network parameters that cause or proximately cause a particular bug or that are in common in causing or proximately causing a set of bugs.

In various embodiments, the machine learning module 506 serves, in one capacity, to learn generalities of the types of control inputs, system parameters, and network parameters that cause a particular bug or a set of bugs through experience. The generalities are represented in the bug classification model 532 and are contemplated to be extrapolated by a bug implementation module 508. The bug implementation module 508 serves to formalize or represent the generalities within the bug classification model 532 into bug implementation conditions 510, which include rules 548, categories 550, game scenarios 552, and system scenarios 554. The bug implementation module 508 is also shown to include a bug implementation library 512 having bug-implementation control inputs 556 and bug-implementation system parameters 520. The bug implementation module 508 is, in a sense, a platform that serves to trigger or implement a given bug.

Similar to the bug reproduction module 234 of FIG. 2, the bug implementation module 508 can replay or reproduce a given bug for a developer to view. In addition, however, because the bug implementation module 508 accesses the machine learning module 506, the snapshot database 502, bug implementation conditions 510, and a bug implementation library 512, the bug implementation module 508 can also show a developer a plurality of other ways to cause the same bug and certain constraints or boundaries on those conditions that do cause the bug. The bug implementation module 508 is further contemplated to be able to identify and present newly discovered bugs to the user. For example, when the machine learning module 506 generates machine-learned control inputs 530 and machine-learned variances 503, they may uncover previously unidentified bugs when they are implemented by the automated game testing module 504.

The bug classification model 532 represents generalities associated with the occurrence of bugs in various ways, depending upon the model or the machine learning algorithm 526. For example, generalities may be represented by way of weights, graph connectivity, clustering, distributions, probabilities, and other relationships. From these, rules 548, categories 550, game scenarios 552, and system scenarios 554 may be constructed. Rules 548 define sets of conditions that are to cause a particular bug. For example, a rule such as "if X-down-down-triangle is inputted while character A is at (x, y, z) on the map, then the bug will occur" may be included within rules 548. Categories 550 define a category of conditions that cause a particular bug. For example, a category may circumscribe a universe of control inputs that are found to cause the bug.

Game scenarios 552 and system scenarios 554 further specify rules or categories related to scenarios in either the video game or the system or network that are causative of the bug. For example, there may be a game scenario 552 in which an AI character falls through the world when the character attempts to jump. The game scenario 552 may help identify bugs that are not necessarily produced by input by a player. Additionally, system scenarios 554 describe states of system and network parameters that are causative of some bug. For example, a system scenario 554 may specify that a game session with a latency of over 70 milliseconds, an overclocked CPU, and with a rendering of 60 FPS will cause the player to fall through the virtual world. Of course, there may be slippage between each of rules 548, categories 550, game scenarios 552, system scenarios 554 such that one with relate or depend upon another.

It is also contemplated that the bug implementation module 508 includes a bug implementation library 512, including bug-implementation control inputs 556 and bug-implementation system parameters 520 that, when executed, will reproduce various bugs. When a new build for the video game application 538 is being tested, the bug implementation module 508 may be used to test the new build for the presence of those previously tester- or machine-identified bugs. In this manner, the developer in enabled to test previously identified bugs automatically without the game testers 501 having to attempt to recreate the bugs from the prior build.

Figure 6:
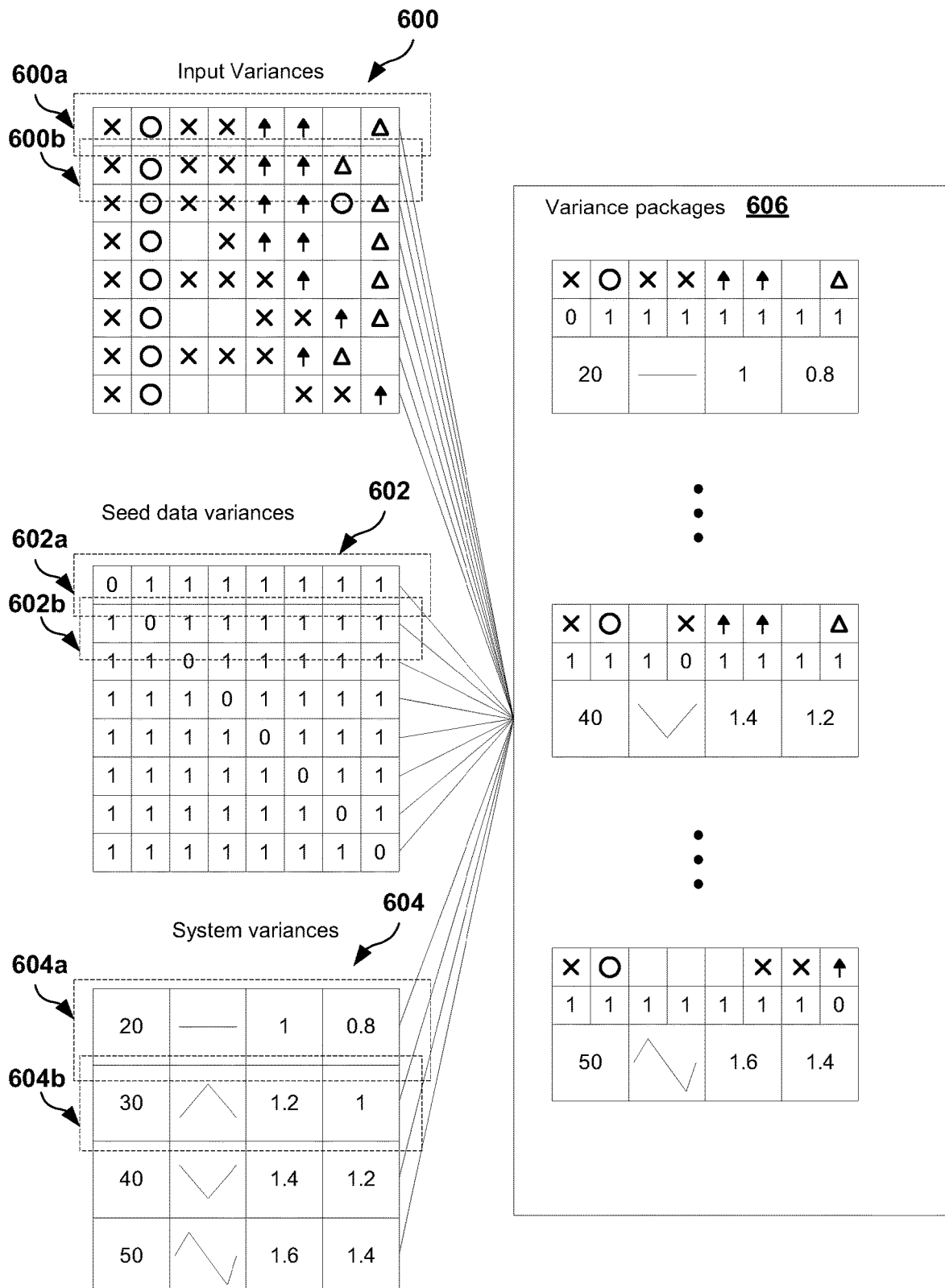
FIG. 6 shows a conceptual diagram of how the variance implementation module creates variance packages that are executed alongside an automated game session at the automated game testing module, according to one embodiment.

FIG. 6 shows a conceptual diagram of how the variance implementation module 536 creates variance packages 606 that are executed alongside an automated game session at the automated game testing module 504. Input variances 600 include variances in the sequence and timing of control inputs that are sent to and executed by the automated game testing module 504 for the automated game sessions. For example, sequence 600a may be identical to a player-generated sequence of control inputs that was identified by a game tester. Sequence 600a may thus serve as a control that is expected to cause the bug. Sequence 600b is varied from sequence 600a in that the triangle input is temporally shifted to some time sooner. Input variances 600 may assist in establishing the bug implementation conditions 510. For example, if sequence 600b returns the same bug as sequence 600a, then timing difference between sequence 600a and sequence 600b may be ruled as non-determinative of causing the bug. On the other hand, if sequence 600b does not return a bug as sequence 600a, then the timing of inputting the triangle may be determinative of causing the bug, if all else is held equal between sequences 600a and 600b.

Additionally, seed data variances 602 are shown to vary seeding data for initializing the automated game sessions. Seed data 602a and seed data 602b, for example, differ in their first and second seeds. Introducing variances in seed data may assist the bug implementation module 508 in determining whether and how seed data affect causation of the bug. For example, if seed data 602*a* and seed data 602*b* return differing bug results, it may be surmised that the first or second seed, or both, are causally related to causation of the bug. In a second iteration of variance implementation module 536, seed data variations may be introduced to isolate the seed that is causally linked to the bug.

Further, the variance implementation module 536 is configured to introduce variances to system and network parameters in system variances 604 to be simulated during the automated testing sessions. In system variances 604, the first column may represent latency, the second jitter, the third CPU clock, and the fourth GPU clock. System variances 604 may be used to mimic various real-world gaming conditions where players play video games with varying latency properties, jitter properties, CPU and GPU configurations, and other hardware and network variations. System variances 604 assist in not only emulating real-world gaming conditions, but also pinpointing whether such conditions are causally related to the occurrence of the bug. The variance implementation module 536 combines input variances 600, seed data variances 602, and system variances 604 to generate a plurality of variance packages. When the automated game sessions are spun up by the automated game testing module 504, the operating system 542 may implement the set of conditions specified by the variances packages 606 during execution of the automated game sessions.

Figure 7:
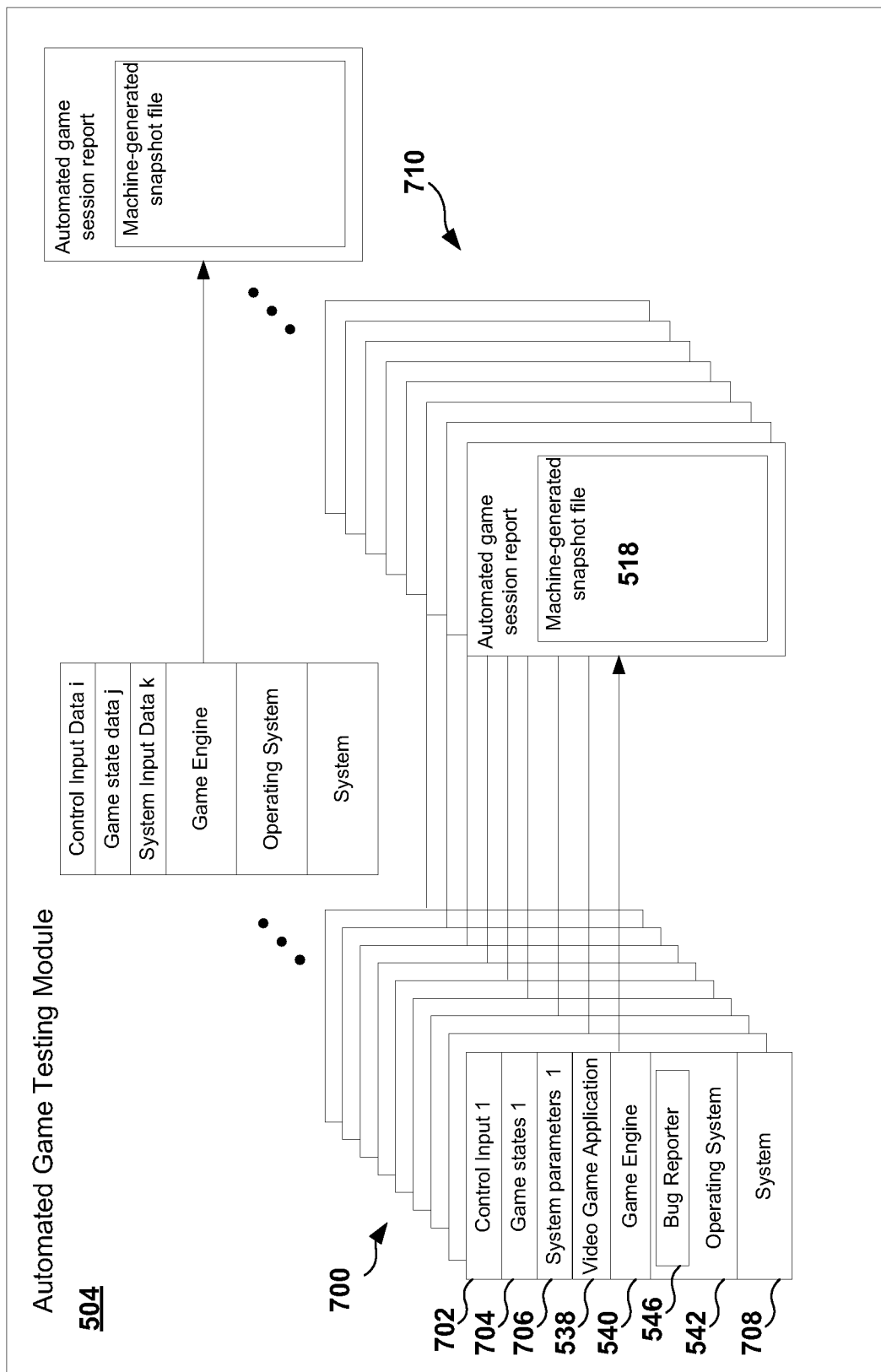
FIG. 7 shows a conceptual illustration of the automated game testing module that is executing a plurality of automated game sessions, according to one embodiment.

FIG. 7 shows a conceptual illustration of the automated game testing module 504 that is executing a plurality of automated game sessions 700, according to one embodiment. Each of the automated game sessions 700 is executed on a system 708 communicating with an operating system 542, which operates a game engine 440. The game engine 540 in turn executes the video game application 538 for the video game sessions 700. While the video game sessions 700 are being run, control inputs 702, game states 704, and system parameters 706 are implemented in synchrony with the video game application 538. For example, the control inputs 702 may be implemented during execution of the video game application 538 via an input socket of the game engine 540. The control inputs 702 may be the machine-learned control inputs 530 or the player-generated control inputs 516 as modified by the variance implementation module 536. Additionally, control inputs 702 may include control inputs from more than one virtual player for a multiplayer game. For example, the player generated snapshot files 514 may include a sequence of control inputs 516 for each player during testing. The machine-learning module 506 is operable to generate machine-learned control inputs 530 that vary the control inputs for just one player or more than one player. As a result, the automated game testing module 504 is contemplated to test for bugs that are associated with multiplayer games and scenarios in which player interaction of some sort causes the bug.

Game states 704 such as seed data may also be implemented via the game engine such that the video game application is initialized with the pre-defined seed data. System parameters 706 such as machine-learned variances 503 as modified by the variance implementation module 536 may be implemented at the operating system 542 level or the system 708 level.

During each run of the automated game sessions 700, a bug reporter 546 is executed at the operating system 542 level or the game engine 540 level. The bug reporter 546 is configured to automatically monitor and detect the occurrence of a pre-defined bug or a previously un-identified bug. Each run of the automated game sessions 700 produces a corresponding automated game session report 710, which includes the machine-generated snapshot file associated with the occurrence of a bug or not. In this manner, any number of automated game sessions 700 may be spun up to better understand the conditions and the boundaries of what causes the bug. Understanding the conditions and their boundaries enables the developer to address the bug in a more efficient manner.

A game application such as video game application 538 will generally demand a game engine serving a plurality of diverse functions. A typical game engine has many subcomponents for handling various aspects or features of the game environment and defining how it should behave, for example, in response to player input. Some of these subcomponents, or what will be referred to as "game engine nodes," include a timing node, a physics node, an artificial intelligence (AI) node, a game logic node, game mechanic node, a rendering rode (which may itself be subdivided into a number of nodes), a map node, an animation node, an asset management node, a network node, an communications node, an control inputs node, a chat node, and others. The rendering node may refer to various rendering functions (e.g., such as those typical of graphics APIs like DirectX® or OpenGL®), including camera transformations, projections, clipping, lighting, shading, smoothening, etc. Additionally, game engines may offer additional services that benefits the gameplay, such as a social network interactivity node, a game-help node, an in-game resource surfacing node, a gameplay sharing or broadcast node, etc.

In some game engine embodiments, the game engine may be served by a single compute node, such as a computer, a server, a console, or other device. In other embodiments, the compute node may be a virtual machine that is deployed by a server for the game engine along with others deployed to serve other game engines and game application there run. As a result, each of the game engine subcomponents are executed by one compute node, e.g., one server, virtual machine, desktop computer, or console. This one-to-one or many-to-one architecture of game engines to compute nodes may not offer the performance desired of the game engine nor the efficiency desired of usage of the compute node because game engines may be elastic in their computational demands as opposed to fixed. That is, the game engine, at any given time, may have differing processing, graphics, memory, and network demands from that of any other given time within the same game.

For example, in massively multiplayer online role-playing game (MMORPG), the computing needs of the associated game engine may depend upon the type of action occurring in the game (e.g., whether players are engaging one another), the number of players (e.g., whether there are 10 players currently but will be 100 players in the near future), among other factors. When a game engine is resourced with one computing node, e.g., within a server, the associated hardware is likely to have a narrow window in which it performs as efficiently as desired while having the performance desired. For example, when the players are few and non-interacting in the MMORPG, the associated compute node may be underutilized, whereas when the players are many and mutually engaging, the associated compute node may underperform, causing a lower quality of service, lag, rendering quality issues, glitches.

These considerations are no less pertinent to the context of automated game testing where hundreds or thousands or more game sessions and associated game engines may be instantiated at a time. For example, the computational demands of the game engines instantiating the plurality of automated game sessions will vary in a time dependent way depending upon the behavior of the game environment and objects there within, e.g., farming resources at one time and battling an AI character at another. demands. Moreover, the type of computing demands may vary as a function of time or game state. For example, the processing, graphics, memory, and network demands of the game engine may vary between on scene in which a player is shooting a free-throw and when, after missing the free throw, the opposing team rebounds the ball and moves the ball up court. Further, in the automated game sessions may be used to automate multi-player game play by implementing control inputs for multiple players simultaneously during the runs. The presence of multiplayer inputs further causes further elasticity in the computing demands of the corresponding game engine, for example, depending upon the number of players and their level of interaction. An improved game engine architecture is therefore contemplated to execute the automated game sessions for the automated game testing module 504.

Figure 8:
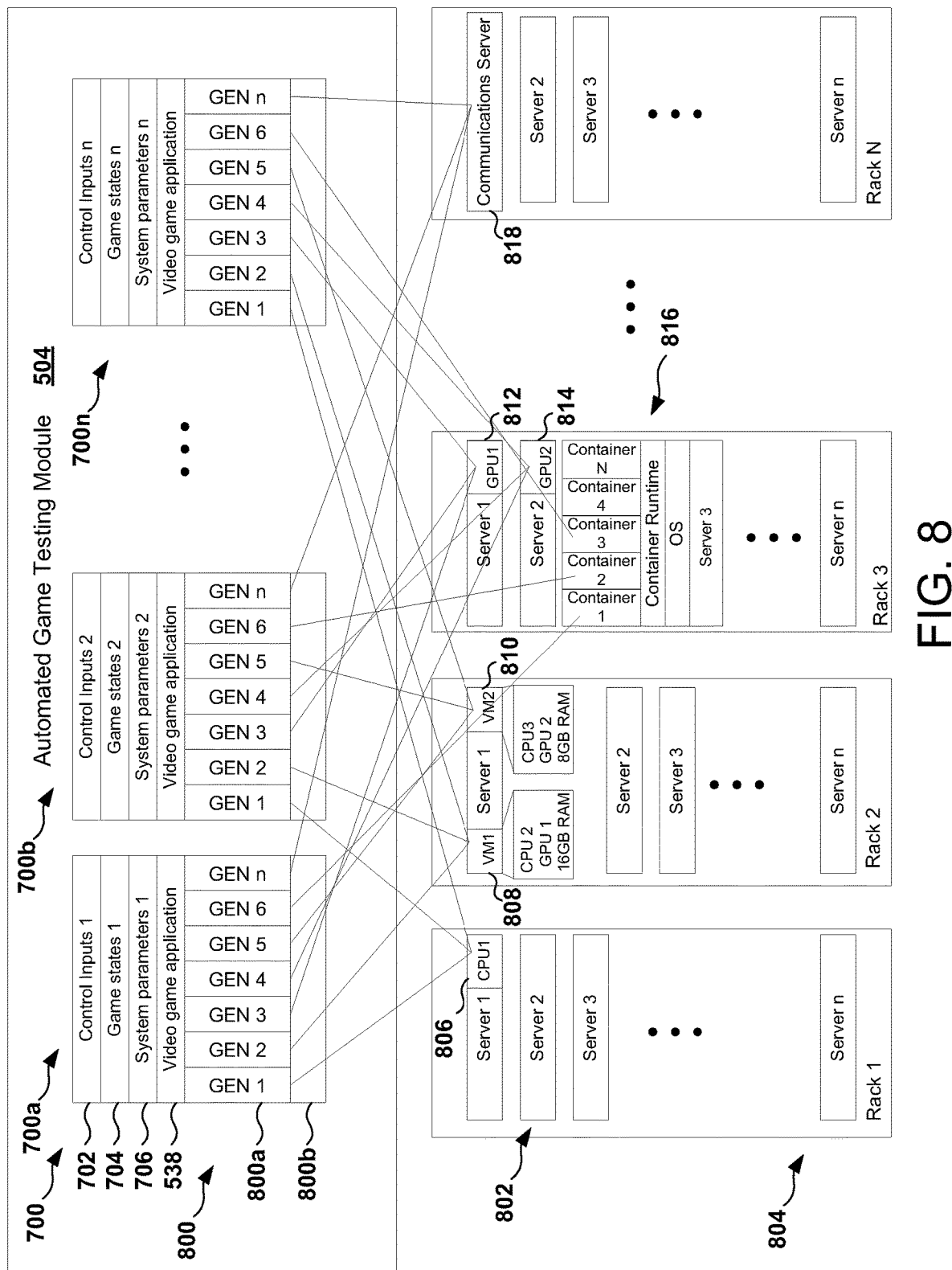
FIG. 8 illustrates a diagram of the architecture of an automated game testing module utilizing a distributed game engine for executing a plurality of automated game sessions, according to one embodiment.

FIG. 8 illustrates a diagram of the architecture of an automated game testing module 504 utilizing a distributed game engine 800 for executing a plurality of automated game sessions 700, according to one embodiment. The video game application 538 is executed on a distributed game engine 800 having a plurality game engine nodes 800a and a game engine manager 800b. Each of the game engine nodes 800a is contemplated to serve subcomponent or part of a subcomponent of the distributed game engine 800 as a whole. In some embodiments, the game engine nodes 800a may be predefined based on the functionality it provides for the distributed game engine 800. For example, there may be game engine node 800a that is defined or dedicated to carry out the functions related to each of game logic, game mechanisms, game timing, AI, physics, input mapping, scripting, network, audio, graphics, animation, asset management, as well as in-game services. For example, for automated game session 700a game engine node 1 (GEN 1) may be dedicated to handling the game logic subcomponent/function, for example, and not any function related to graphics, or asset management. Meanwhile, game engine node 2 (GEN 2) may be defined to handle AI exclusively, with GEN 3 defined for physics, GEN 4 for scripting, GEN 5 for graphics, GEN 6 for scripting, and GEN n for a service such as real time game broadcasting.

Each of the game engine nodes 800a is matched by the game engine manager 800a with a compute node within the servers 802 of racks 804 depending upon the computational demands of each game engine node 800a. The game engine nodes 800a may communicate with the compute nodes via UDP or TCP or some other protocol. The servers 802 and racks 804 may be localized at data center or the like. The game engine manager 800b serves as a bus between a game engine node 800a and an assigned compute node. The game engine manager 800b performs various tasks related to sending and receiving data, buffering, routing, threading, queuing, relaying, stitching, etc. In this manner, game engine manager 800b ensures that operations of each of the game engine nodes 800a is performed by a desired compute node and the resulting return values or other result is delivered back to the proper game engine node 800a for implementation into the video game application 538. Moreover, the game engine manager 800a manages communication between game engine nodes 800a to ensure proper functioning of the video game application as a whole.

As shown in FIG. 8 game engine node 1 GEN 1 is assigned to a compute node 806, which is associated with a hardware CPU located on server 1 of rack 1. The game engine manager may have sourced compute node 806 for its suitability in handling the computational needs of game logic, for example.

Meanwhile automated game session 700b is likewise being executed on a distributed game engine 800 having a plurality of game engine nodes GEN 1-n, each of which are assigned to handle a particular function or subcomponent of the distributed game engine 800. The same is true of game session 700n. For example, the operations of GEN 1 of automated game session 700b and GEN 1 of automated game session 700n are both assigned to compute node 806 of server 1 of rack 1, similar to GEN 1 of automated game session 700a. Thus, compute node 806 executes the processes requested of it by each of GEN 1, GEN 2, and GEN 3. GEN 2 for each of automated game sessions 700a, 700b, and 700n are assigned to compute node 808, which is a virtual machine VM 1 provisioned with CPU 2, GPU 1, and 16 gigabytes of RAM. The game engine managers 800b may have identified VM 1 based on the expected needs of GEN 2, which, for example, serves to execute AI. In some embodiments, the game engine manager 800b may have itself requested deployment of VM 1, or the automated game testing module 504 may have made the request. In some embodiments, if the operations requested to be performed by the compute node are substantially similar for each of the game engine nodes assigned to it, the compute node could potentially perform the requested operations once and return the result to each of the game engine nodes as opposed to performing the requested operations one time for each of the game engine nodes.

GEN 3 of each of the automated game sessions 700 are shown to be associated with a compute node 812 associated with a GPU 1, whereas GEN 4 is associated with compute 814 associated with GPU 2. GPU 1 and GPU 2 may be of different configurations. For example, GPU 1 may have more cores, a higher clock, more memory, or a higher memory bandwidth than GPU 2. In this case, operations for GEN 3 may have been assigned to GPU 1 if GEN 3 demands a greater number of calculations or more complex calculations. Operations for GEN 4 may have been assigned to GPU 2 because GEN 4 may demand fewer calculations or less complex ones.

GEN 5 is shown to be assigned to compute node 810, which is a virtual machine VM 2 provisioned with a CPU 3, a GPU 2, and 8 gigabytes of RAM. GEN 5 may have been assigned by the game engine manager 800b to compute node 810 to match the computing needs of GEN 5. GEN 6 of the automated game sessions 700 is shown to be assigned to a containerized compute node 816 that includes containers 1-N that interface with a host operating system on server 3 of rack 3. In particular, GEN 6 of automated game session 700a is assigned to container 1, that of automated game session 700b to container 2, and that of automated game session 700n to container N. Each of containers 1-N is a contained unit of software and dependencies that, for example, includes the software for processing operations of the associated game engine nodes. Each container runs on container runtime, which interfaces with the operating system of the server. In this sense, the operating system is virtualized for each of the containers, whereas it is the hardware that is virtualized for a virtual machine.

Figure 9A:
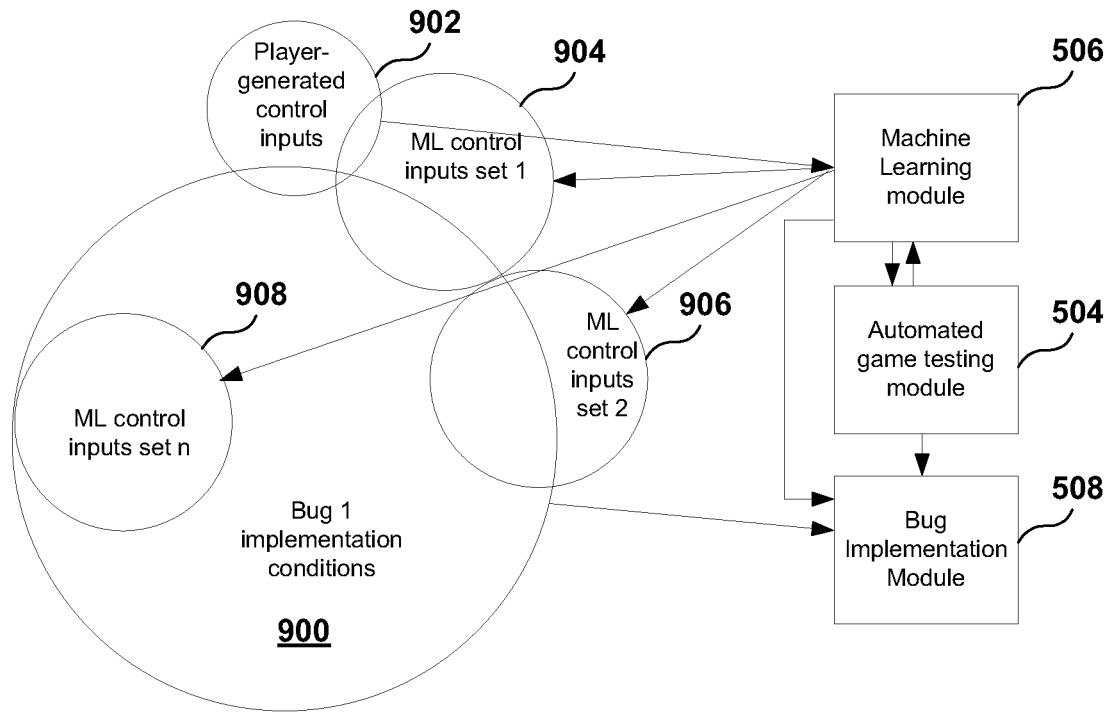
FIGS. 9A and 9B show conceptually how the machine learning module, the automated game testing module and the bug implementation module work together to identify the set of conditions in which a previously or newly identified bug may be implemented, according to various embodiments.
Figure 9B:
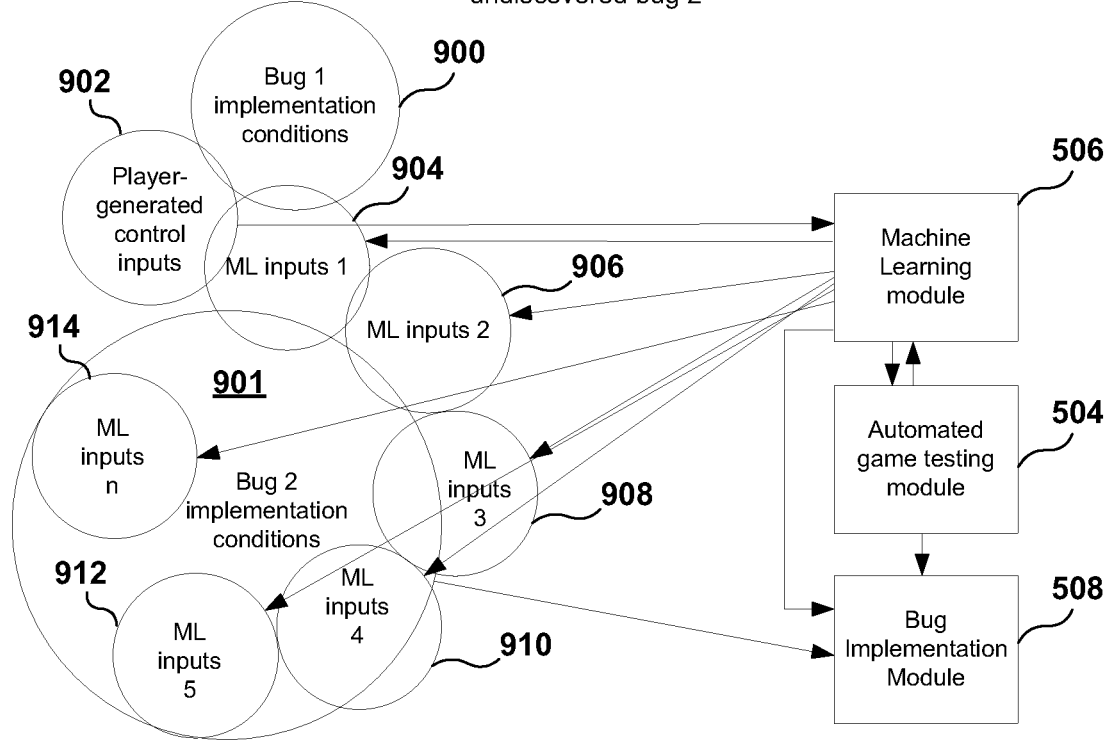

FIGS. 9A and 9B show conceptually how the machine learning module 506, the automated game testing module 504 and the bug implementation module 508 work together to identify the set of conditions in which a previously or newly identified bug may be implemented, according to various embodiments. Bug implementation conditions refer to the scope or universe of conditions that are causally related to the occurrence of a given bug. Conditions refer to control inputs, system parameters, network parameters, and game states that, when caused to exist or coexist during the execution of the game application, are individually or collectively causative of the given bug. Thus, bug implementation conditions may be conceptualized in multi-dimensional space as the set of all combinations of conditions that cause or are likely to cause the bug. Here, bug 1 implementation conditions 900 will refer to the set of combinations of control inputs when executed under particular system and network parameters and at certain game states, cause or are likely to cause bug 1. The machine learning module 506, the automated game testing module 504, and the bug implementation 508, are contemplated to work in conjunction to identify, circumscribe, or approximate bug 1 implementation conditions to assist the developer in understanding root causes of the bug for higher quality and more effective fixes. The bug 1 implementation conditions 900 may be formalized in terms of rules, categories, and scenarios in the bug implementation module 508 for communication to the developer. The following will be described with respect to machine-learned control inputs for filling in the bug 1 implementation conditions 900 for the sake of clarity. However, the principles apply with similar force to using machine-learned system and network parameters and game state data for corralling the rest of bug 1 implementation conditions.

When one or more game testers identify a bug, the player-generated control inputs 902 are recorded in snapshot files and processed by the machine learning module 506. The machine learning module 506 uses a bug classification model to generate machine-learned control inputs 904, which are then implemented by automated game testing module 504 for detection of bug 1 or not. Here, a portion the machine-learned control inputs 904 cause bug 1. The results are fed back into the machine learning module 504 to update the bug classification model and to generate a new set of machine-learned control inputs 906. Here, a larger portion of the second set of machine-learned generated control inputs 906 cause bug 1 than the first set of machine-learned control inputs 904, as may be expected. The process of learning and testing is repeated for machine-learned control inputs 908, and so on until, for example, no new sets of control inputs are found to cause the bug. The bug 1 implementation conditions 900 is then processed by the bug implementation module 508 for extracting any rules, categories, or scenarios that may be ascribed to the bug 1 implementation conditions 900.

In FIG. 9B, the learning and testing process discovers new bug 2 during analysis of the bug 1 implementation conditions 900. For example, machine-learned control inputs 904 are tested by automated game testing module 504 and found to trigger both bug 1 and bug 2. In this instance, the machine-learning module 506, the automated game testing module 504 and the bug implementation module 508, may, in addition to or in parallel with corralling bug 1 implementation conditions 900, do the same for bug 2 implementation conditions 901. Machine-learned control inputs 906-914 are generated by the machine learning module 506 and are tested by automated game testing module 904. The resulting scope of bug 2 implementation conditions 901 are then formalized into rules, categories, and scenarios by bug implementation module 508, which will have those rules, categories, and scenarios for both bug 1 and bug 2.

Figure 10:
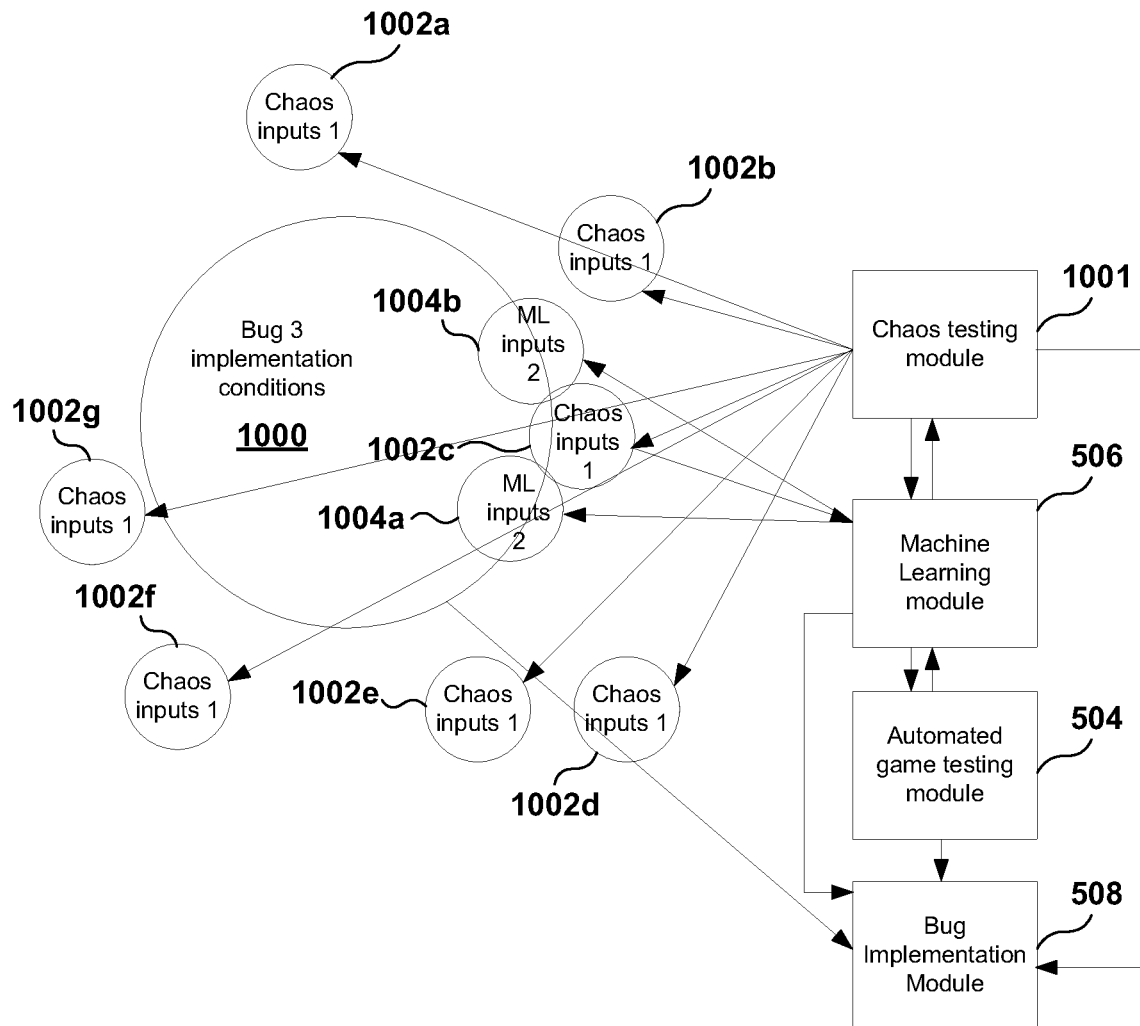
FIG. 10 shows a method of discovering new bugs via chaos or shotgun testing, according to one embodiment.

FIG. 10 shows a method of discovering new bugs via a chaos or shotgun testing, according to one embodiment. In addition to defining the bug implementation conditions for known bugs or player-identified bugs, the systems and methods presented here are contemplated to detect unidentified bugs in an automated manner. In some embodiments, chaos testing or shotgun testing is provided to uncover undiscovered bugs. Here, a chaos testing module 1001 generates sets of chaos inputs 1002*a-g*. Each of chaos inputs 1002*a-g* may include a set of randomly, stochastically, or chaotically defined inputs. In other embodiments, the chaos inputs 1002*a-g* may be of known or knowable sequences of inputs that are designed to stress the game application. In any case, out of the chaos inputs 1002*a-g*, chaos input 1002*c* is shown to cause bug 3 as detected by the automated game testing module 504. The automated game testing module 504 relays the results to the machine learning module 506, which generated more targeted machine-learned inputs 1004*a* and 1004*b*. The learning and testing process continues until the scope of bug 3 implementation conditions 1000 may be defined. In some embodiments, the chaos testing module 1001 may continue to generate chaos inputs to find other ways of inducing bug 3 or other bugs. As a result, the methods of system presented here are further enabled to automatically identify previously unknown bugs. The process of identifying previously unknown bugs using the chaos testing module 1001, the machine learning module 506, the automated game testing module 504, and the bug implementation module 508 may be offered to developers as a service (e.g., testing as a service, TaaS), as discussed in greater detail below.

Figure 11:
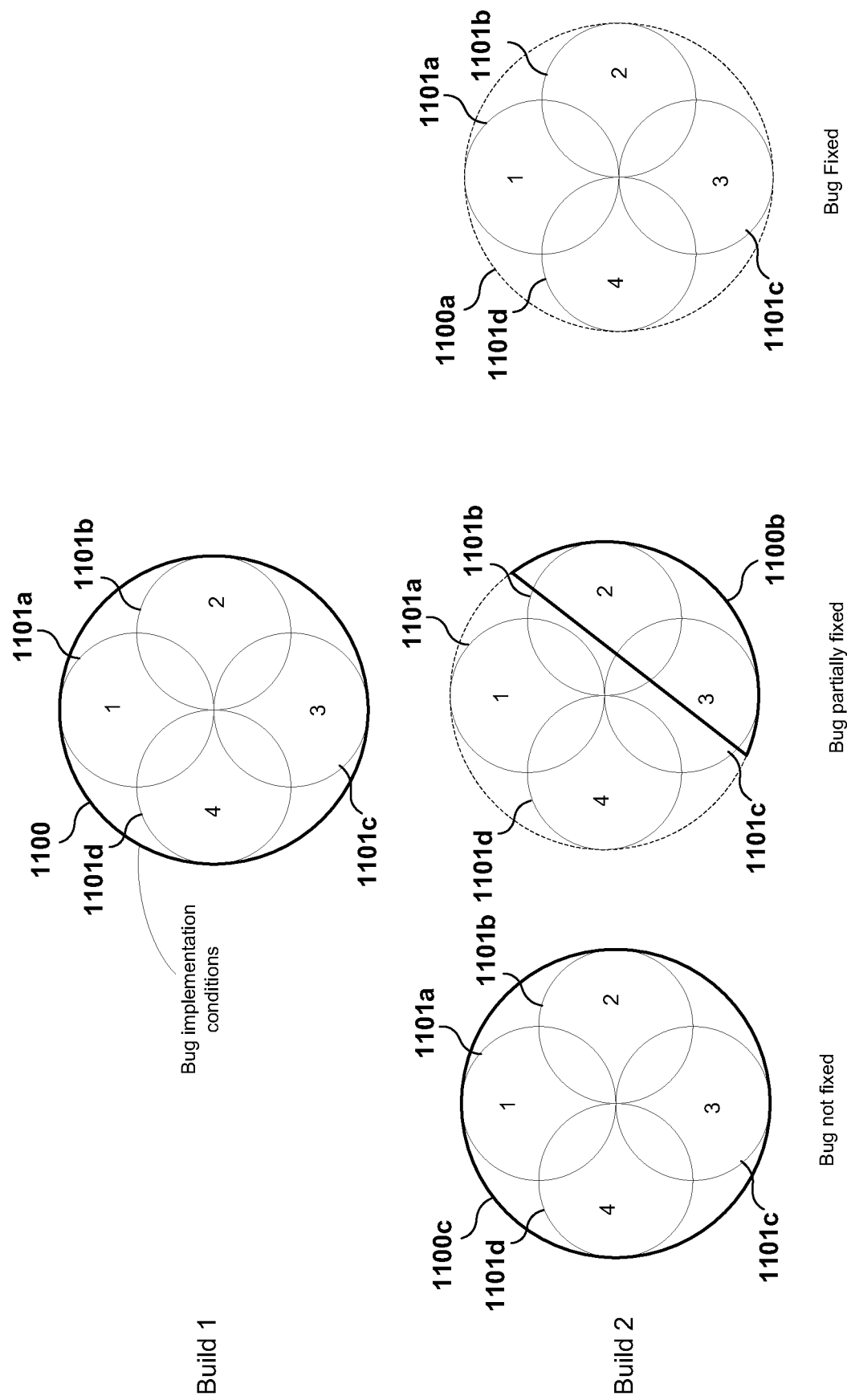
FIG. 11 shows a conceptual diagram of automated testing for a previously identified bug in a new build or version of a game, according to one embodiment.

FIG. 11 shows a conceptual diagram of automated testing for a previously identified bug in a new build or version of a game. Assume that the circle of the bug implementation conditions 1100 represents the bug implementation conditions 1100 in control input, game state, system and data parameter space for a first build. Further assume that the bug implementation module has defined four categories of control inputs 1101*a-d* that effectively overlap with much of the bug implementation conditions 1100 and that trigger the bug for the first build. If each of the control inputs 1001*a-d* again cause the bug for a second build, it may be the case that the bug was not fixed. If instead only a portion of the control inputs 1101*a-d* cause the bug, it may be the case that the bug was partially fixed. Otherwise, if none of the control inputs 1101*a-d* cause the bug when they are implemented in the second build, it may be the case that the bug was fixed. Thus, when a second build is constructed, a previous bug from a prior may be automatically tested in a quick and efficient manner.

Figure 12:
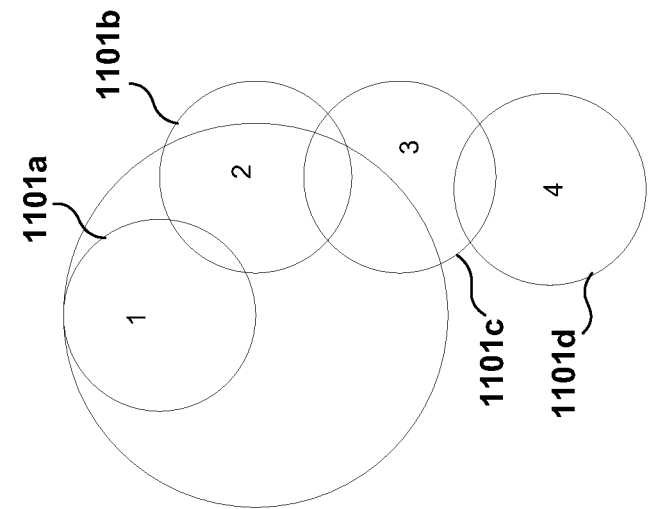
FIG. 12 shows how bug implementation conditions known for a first game may be applied to a second game as part of testing as a service (TaaS), according to one embodiment.
Figure 12:
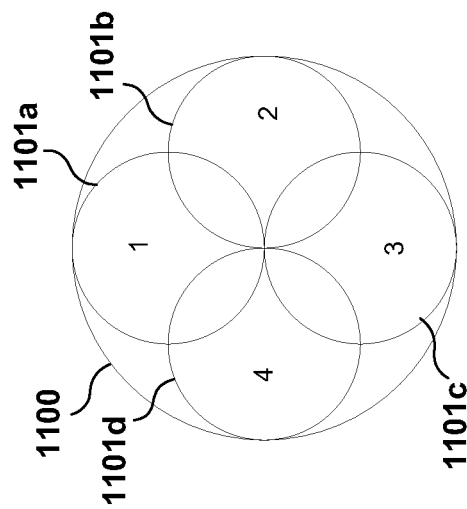

FIG. 12 shows how bug implementation conditions known for a first game may be applied to a second game as part of testing as a service (TaaS), according to one embodiment. In FIG. 12 bug implementation conditions 1100 for a first game are known and are reproducible using control inputs 1101*a-d*. As part of the testing as a service process, the control inputs 1101*a-d* may be applied to a second game title that may be created by a different developer than the first game title. In FIG. 12, control inputs 1101*a-c* are shown to cause a bug in part or in whole, whereas control input 1101*d* is shown to be outside of the bug implementation conditions for game title 2 and therefore not causative of the bug.

Figure 13:
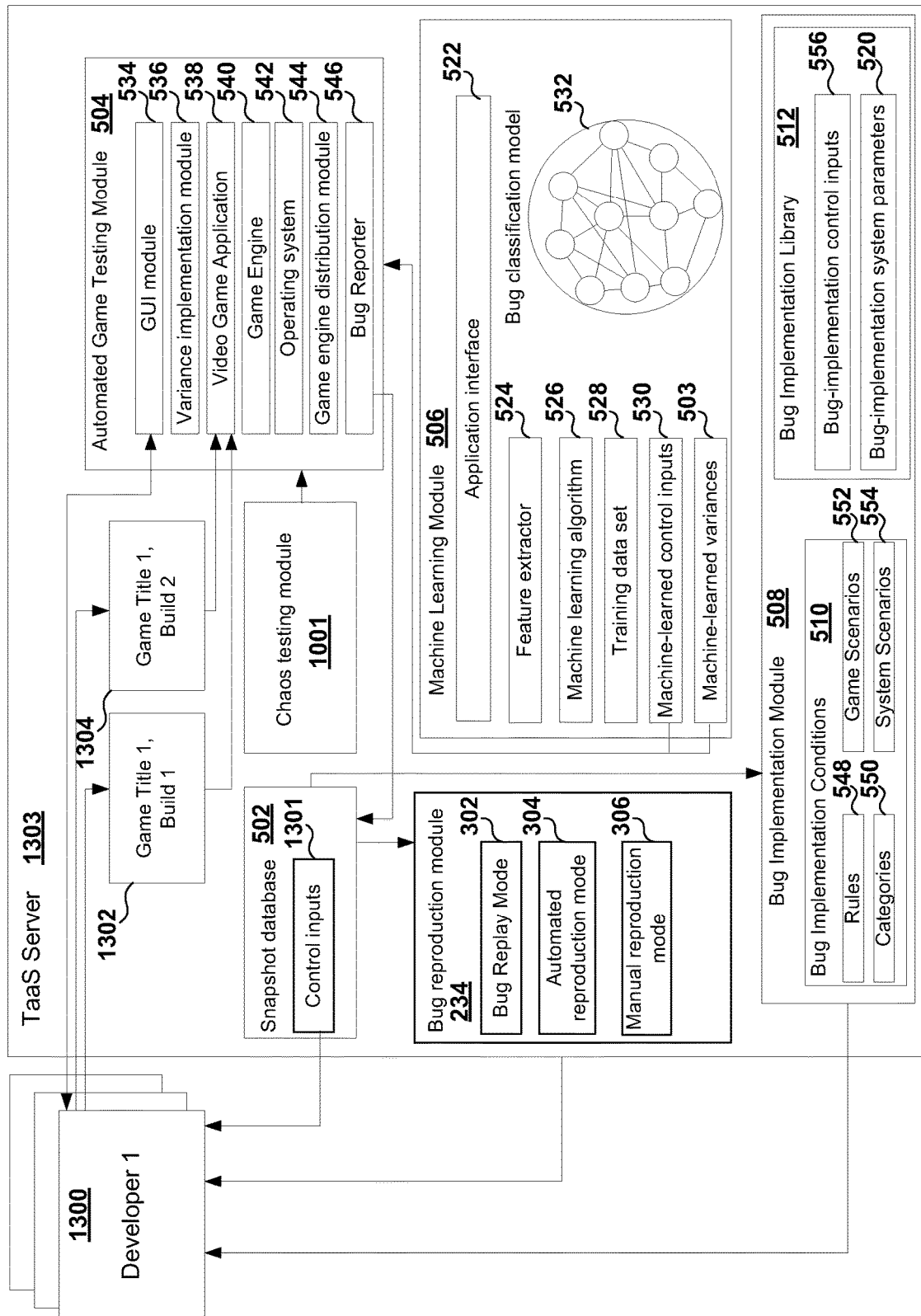
FIG. 13 is a conceptual illustration of a platform usable for testing as a service (TaaS), according to one embodiment.

FIG. 13 is a conceptual illustration of a platform usable for testing as a service (TaaS), according to one embodiment. TaaS is contemplated to enable game developers to test video games for bug and validating bug fixes without needing a team of human game testers. Here, a developer 1300 simply drops a game into a TaaS server 1303, which includes a game title 1302 of a first build. The game title 1302 is executed as video game application 538 that run on an appropriate game engine 540. The game engine 540 may be a distributed game engine implemented in a manner shown in FIG. 8. An appropriate operating system 540 is sourced for the game engine 540. If the game title 1302 is intended to be executed on differing game engines, differing operating system, or versions thereof, the automated game testing module 504 may correspondingly spin up automated video game sessions of the video game application 538 for each type of game engine 540 and operating system 542 and combinations desired thereof. The automated game sessions may be run in parallel or otherwise.

The game title 1302 may be tested by the automated game testing module 504 in many ways. For example, the TaaS may supply chaos testing of the video game application 538 via chaos testing module 1001. Any bugs that are identified via chaos testing will be recorded to the snapshot database 502. Further, if the developer 1300 has previously identified a bug and wishes to understand the circumstances causing the bug, they may interact with the video game application 538 while executed on the TaaS to manually cause the bug. A snapshot file is will be generated as a result of such interaction and the control inputs causing the bug will be recorded to snapshot database 502. The machine learning module 506 may then generate new machine-learned control inputs 530 and machine-learned variances 503 that are also causative of the bug.

Moreover, the video game application may be tested against bug implementation conditions 510 and bug implementation control inputs 556 and bug-implementation system parameters 520 of the bug implementation module 508. The bug-implementation module 508 may provide various control inputs and system and network parameters that have been known to cause bugs for prior builds of this video game, for differing video games with similar features to game title 1302, or for differing games having a game engine in common. Further still, the TaaS Server 1303 may communicate with one or more human game testers for discovery of bugs the raw test data of which is generated into snapshot files at snapshot database 502.

Any bugs that are identified in the abovementioned ways are recorded in the snapshot database along with the control inputs 1302 (as well as system and network parameters) that caused the bug. These will be shared with developer 1300. Moreover, these bugs may be reproduced for the developer 1300 via the bug reproduction module 234, in any of the replay mode 302, automated reproduction mode 304, or the manual reproduction mode 306. In this fashion, the developer may view in a GUI such as the bug reproduction GUI 300 any discovered bugs and the source code, game states, control inputs, and video components associated with the bug.

The snapshot database 502 is accessed by the machine learning module 506 for generating machine-learned control inputs 530 and machine-learned variances 503 that are predictively causative of the previously identified bug or a new bug. These machine-learned control inputs 530 and machine-learned variances 503 are then tested at the automated game testing module 504 for the bug reporter 546 to detect whether previously identified bug or a previously unidentified bug has occurred. The results of the automated game testing module 504 are again recorded in the snapshot database 502. Here, again, the machine-learned control inputs 530 and the machine-learned variances 503 may be provided to the developer 1300 so that the developer can be apprised of additional control inputs and system and network parameters that are causative of the bug. Moreover, the developer may be apprised of new bugs and the control inputs and system and network parameters that caused them.

The process of learning and testing may be repeated to refine the bug classification model 532 such that generalities associated with causation of the bug may be extracted by the bug implementation module 508 via rules 548, categories 550, game scenarios 552 and system scenarios 554. The bug implementation conditions 510 may then be provided to the developer 1300, which helps to identify the conditions causing the bug. This enables the developer 1300 to better understand the underlying cause of the bug to such that higher quality fixes may be applied. After the developer 1300 attempts to fix the bug for a second build of the game title 1304, the game title 1304 may again be dropped into the TaaS server 1303 for validation and testing. To see if the bug has been fixed, certain control inputs 1302 known to have caused the bug in the prior build, the first build, may be tested at the automated game testing module 504. Additional control inputs and system parameters may be generated from the bug implementation module 508 that, while not necessarily tested as causing the bug for the prior build, are expected to have using rules 548, categories 550, game scenarios 552, and system scenarios 554. In this manner, the developer 1300 is enabled to quickly test the operation of a new build with a bug fix.

Figure 14:
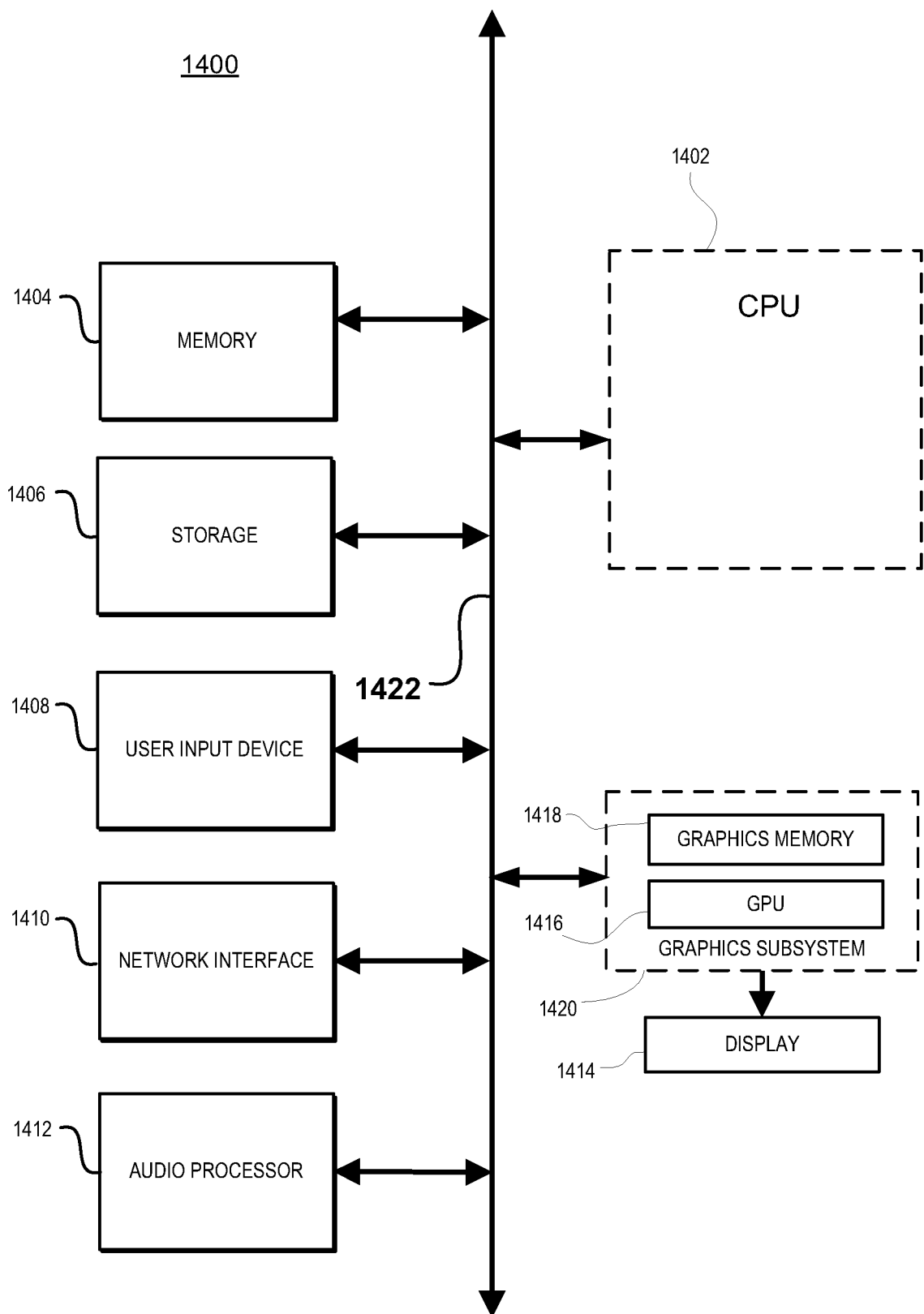
FIG. 14 illustrates components of an example device that can be used to perform aspects of the various embodiments of the present disclosure, such as the TaaS server.

FIG. 14 illustrates components of an example device 1400 that can be used to perform aspects of the various embodiments of the present disclosure, such as server system 200, server system 500, one of servers 802, or the TaaS server 1300. This block diagram illustrates a device 1400 that can incorporate or can be a personal computer, video game console, personal digital assistant, a server or other digital device, suitable for practicing an embodiment of the disclosure. Device 1400 includes a central processing unit (CPU) 1402 for running software applications and optionally an operating system. CPU 1402 may be comprised of one or more homogeneous or heterogeneous processing cores. For example, CPU 1402 is one or more general-purpose microprocessors having one or more processing cores. Further embodiments can be implemented using one or more CPUs with microprocessor architectures specifically adapted for highly parallel and computationally intensive applications, such as automated game testing, machine-learning operations, and bug reproduction processes. Device 1400 may be a localized to a player playing a game segment (e.g., game console), or remote from the player (e.g., back-end server processor).

Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to device 1400, examples of which may include keyboards, mice, joysticks, touch pads, touch screens, still or video recorders/cameras, tracking devices for recognizing gestures, and/or microphones. Network interface 1410 allows device 1400 to communicate with other computer systems via an electronic communications network and may include wired or wireless communication over local area networks and wide area networks such as the internet. An audio processor 1412 is adapted to generate analog or digital audio output from instructions and/or data provided by the CPU 1402, memory 1404, and/or storage 1406. The components of device 1400, including CPU 1402, memory 1404, data storage 1406, user input devices 1408, network interface 1410, and audio processor 1412 are connected via one or more data buses 1422.

A graphics subsystem 1420 is further connected with data bus 1422 and the components of the device 1400. The graphics subsystem 1420 includes a graphics processing unit (GPU) 1416 and graphics memory 1418. Graphics memory 1418 includes a display memory (e.g., a frame buffer) used for storing pixel data for each pixel of an output image. Graphics memory 1418 can be integrated in the same device as GPU 1416, connected as a separate device with GPU 1416, and/or implemented within memory 1404. Pixel data can be provided to graphics memory 1418 directly from the CPU 1402. Alternatively, CPU 1402 provides the GPU 1416 with data and/or instructions defining the desired output images, from which the GPU 1416 generates the pixel data of one or more output images. The data and/or instructions defining the desired output images can be stored in memory 1404 and/or graphics memory 1418. In an embodiment, the GPU 1416 includes 3D rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1420 periodically outputs pixel data for an image from graphics memory 1418 to be displayed on display device 1414. Display device 1414 can be any device capable of displaying visual information in response to a signal from the device 1400, including CRT, LCD, plasma, and OLED displays. Device 1400 can provide the display device 1414 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

Most video games played over the Internet operate via a connection to the game server. Typically, games use a dedicated server application that collects data from players and distributes it to other players. Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
executing, on a server of a cloud testing system, a video game for play by a player, said executing the video game producing a video output;
receiving, from a client device of the player, a sequence of control inputs for interacting with the video game, a portion of the sequence of control inputs causes a bug to appear during said interacting with the video game;
recording the portion of sequence of control inputs that caused the bug along with the video output and game state data produced by the video game in a player-generated snapshot file;
processing the player-generated snapshot file using a machine learning module, the machine learning module extracts features from the sequence of control inputs, the video output, and the game state for classification into a bug detection model;
identifying, using the bug detection model, a set of test control inputs that are likely to reproduce the bug by the video game.

2. The method of claim 1, further comprising:
executing a plurality of automated video game sessions while respectively inputting the set of test control inputs for reproducing the bug, said executing the plurality of automated video game sessions each producing respective game state data and respective video components, wherein the respective test control inputs, game state data, and video components are recorded in respective machine-generated snapshot files in a snapshot database of the cloud testing system.

3. The method of claim 2, further comprising:
performing, using the machine learning module, classification of the respective snapshot files based on whether the bug was reproduced or not and updating the bug detection model based on the classification;
extracting bug-implementation conditions from the bug detection model, the bug-implementation conditions are usable to identify additional control inputs causative of the bug.

4. The method of claim 3, wherein the bug-implementation conditions include one or more rules associated with the bug, the one or more rules are usable to identify a category of sequences of control inputs that are causative of the bug, the category of sequences of control inputs includes the sequence of control inputs and additional sequences of control inputs.

5. The method of claim 3, wherein the bug-implementation conditions include game scenarios associated with the bug, the game scenarios are usable to identify one or more categories of game states that are commonly shared by the player-generated snapshot files and the machine-generated snap shot files associated with an occurrence of the bug.

6. The method of claim 5, wherein the one or more categories of game states specify one or more of a level, a stage, a task, a mission, an in-game action, a map region, a character, an item, an ability, an in-game object, an interaction between in-game objects, an artificial intelligence (AI) character, a player-controlled character, or a structure.

7. The method of claim 3, wherein the bug-implementation conditions include system scenarios associated with the bug, the system scenarios are usable to identify one or more categories of system parameters that are commonly shared by the player-generated snapshot files and the machine-generated snapshot files associated with an occurrence of the bug.

8. The method of claim of claim 7, wherein the categories of system parameters specify one or more of a clock rate of a central processing unit (CPU), a clock rate of a graphics processing unit (CPU), a data rate capacity of a communications link, a latency of the communications link, a jitter associated with the communications link, or a compression rate.

9. The method of claim 1, wherein each of the plurality of automated video game sessions is executed on a distributed game engine, the distributed game engine includes a plurality of functional units having operations performed by a respective plurality of compute nodes, wherein the operation performed by the respective plurality of compute nodes for the distributed game engine is managed by a distributed game engine manager.

10. The method of claim 2, wherein the automated video game sessions are executed on respective distributed game engines, each distributed game engine includes a plurality of game engine nodes for performing respective functions, each of the game nodes communicate with respective compute nodes for processing operations for said performing the respective functions.

11. A computer-implemented method, comprising:
generating player-generated snapshot files from game play of one or more players of a video game, each of the player-generated snapshot files includes a sequence of control inputs, game state data, and a video component that are associated with a portion of the game play of the video game in which a bug occurred;
processing the player-generated snapshot files using a machine learning module to generate a plurality of machined-learned control inputs that are in addition to the sequence of control inputs from the player-generated snapshot files for reproducing the bug;
executing a plurality of automated video game sessions while inputting respective machine-learned control inputs, said executing the plurality of automated video game sessions each producing respective game state data, and respective video components, wherein the respective machine-learned control inputs, the respective game state data, and the respective video components are recorded in respective machine-generated snapshot files; and
processing, using the machine learning module, the machine-generated snapshot files to identify bug-implementation conditions, the bug-implementation conditions are usable to identify categories of sequences of control inputs causative of the bug that are in addition to the sequence of control inputs of the player-generated snapshot files.

12. The computer-implemented method of claim 11, wherein said executing the plurality of automated video game sessions further includes:
introducing variances in parameters associated with execution of the automated video game sessions or the inputting the machine-learned control inputs, the variances in parameters are also recorded in the machine-generated snapshot files for processing by the machine learning module, wherein the bug-implementation conditions are further usable to identify specific variances in parameters that are causative of the bug.

13. The computer-implemented method of claim 11, wherein said processing the player-generated snapshot files using the machine learning module further includes:
extracting features from the player-generated snapshot files based on respective sequences of control inputs, respective game state data, and respective video components;
classifying, using a bug detection model, the player-generated snapshot files based on the features for generating correlations between characteristics of the respective sequences of control inputs and occurrences of the bug; and
constructing the machine-learned control inputs based on bug detection model.

14. The computer-implemented method of claim 12, wherein said introducing variances in parameters associated with execution of the automated video game sessions includes one or more of overclocking or underclocking the central processing unit (CPU), overclocking or underclocking the graphics processing unit (GPU), varying a size or speed of system memory, varying size or speed of graphics memory, varying a size or speed of system storage, varying a size or speed of framebuffer, and varying a resolution or framerate of the respective video components.

15. The computer-implemented method of claim 11, wherein the plurality of automated video game sessions is executed on respective distributed game engines, each distributed game engine includes a plurality of game engine nodes for performing respective functions, each of the game nodes communicate with respective compute nodes for processing operations for said performing the respective functions.

* * * * *